US012038226B2

(12) United States Patent
Zhang et al.

(10) Patent No.: US 12,038,226 B2
(45) Date of Patent: Jul. 16, 2024

(54) FREE EMBEDDED REFRIGERATOR

(71) Applicants: QINGDAO HAIER REFRIGERATOR CO., LTD., Qingdao (CN); HAIER SMART HOME CO., LTD., Qingdao (CN)

(72) Inventors: Hao Zhang, Qingdao (CN); Enpin Xia, Qingdao (CN); Kang Li, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 156 days.

(21) Appl. No.: 17/637,797

(22) PCT Filed: Aug. 27, 2020

(86) PCT No.: PCT/CN2020/111596
§ 371 (c)(1),
(2) Date: Feb. 23, 2022

(87) PCT Pub. No.: WO2021/037110
PCT Pub. Date: Mar. 4, 2021

(65) Prior Publication Data

US 2022/0282902 A1 Sep. 8, 2022

(30) Foreign Application Priority Data

Aug. 28, 2019 (CN) ........................ 201910803353.8
Aug. 28, 2019 (CN) ........................ 201910803454.5
(Continued)

(51) Int. Cl.
*F25D 23/02* (2006.01)
*E05D 3/18* (2006.01)
*E05D 11/06* (2006.01)

(52) U.S. Cl.
CPC ............ *F25D 23/028* (2013.01); *E05D 3/18* (2013.01); *E05D 11/06* (2013.01); *E05Y 2900/31* (2013.01)

(58) Field of Classification Search
CPC ... F25D 23/028; F25D 2323/024; E05D 3/18; E05D 7/0407; E05D 5/14; E05D 7/081;
(Continued)

(56) References Cited

U.S. PATENT DOCUMENTS 2,867,839 A 1/1959 Squire
3,065,498 A 11/1962 Johnson
(Continued)

FOREIGN PATENT DOCUMENTS

AU 431315 B 12/1972
CN 201155900 Y 11/2008
(Continued)

*Primary Examiner* — Hiwot E Tefera
(74) *Attorney, Agent, or Firm* — Cheng-Ju Chiang

(57) ABSTRACT

A free embedded refrigerator which includes a cabinet, a door and a hinge assembly. The hinge assembly includes a first hinge part, a second hinge part and a switching assembly connected with the first hinge part and the second hinge part. When the door is in an opening process, the first hinge part moves relative to the switching assembly to drive the door to rotate in situ relative to the cabinet, and then, the switching assembly drives the second hinge part to move relative to the switching assembly to drive the door to continuously rotate in situ. The refrigerator can adjust opening-closing freedom degree of the door, and various motion tracks may be generated to adapt to different application scenarios.

17 Claims, 21 Drawing Sheets

(30) Foreign Application Priority Data

| | | |
|---|---|---|
| Mar. 16, 2020 | (CN) | 202010179525.1 |
| Mar. 16, 2020 | (CN) | 202010179527.0 |

(58) Field of Classification Search
CPC .. E05D 5/046; E05D 5/10; E05D 5/12; E05D 11/06; E05D 7/085; E05Y 2900/31; E05F 5/06
See application file for complete search history.

(56) References Cited

U.S. PATENT DOCUMENTS

| | | | | | | |
|---|---|---|---|---|---|---|
| 3,083,403 | A | | 4/1963 | Noord | | |
| 3,201,821 | A | | 8/1965 | Ruckstuhl | | |
| 4,151,681 | A | | 5/1979 | Roberts | | |
| 4,609,234 | A | | 9/1986 | Naniwa et al. | | |
| 4,953,259 | A | * | 9/1990 | Frye | B60N 2/847 | 16/337 |
| 5,158,503 | A | * | 10/1992 | Mitchell | E05D 3/12 | 16/302 |
| 5,265,954 | A | | 11/1993 | Keil | | |
| 9,380,863 | B2 | * | 7/2016 | Sakanoue | B60N 3/004 | |
| 9,863,691 | B2 | * | 1/2018 | Kikuchi | E05D 3/022 | |
| 9,995,528 | B1 | * | 6/2018 | Ebrom | H04N 23/64 | |
| 10,876,333 | B2 | * | 12/2020 | Zhang | F25D 23/028 | |
| 2010/0043472 | A1 | * | 2/2010 | Iguchi | A47F 3/0426 | 62/255 |
| 2015/0135761 | A1 | * | 5/2015 | Jang | F25D 21/04 | 62/441 |

FOREIGN PATENT DOCUMENTS

| | | | | | |
|---|---|---|---|---|---|
| CN | 101501288 | A | | 8/2009 | |
| CN | 102062510 | A | | 5/2011 | |
| CN | 201954901 | U | | 8/2011 | |
| CN | 104265103 | A | | 1/2015 | |
| CN | 105546911 | A | | 5/2016 | |
| CN | 105588398 | A | | 5/2016 | |
| CN | 206600959 | U | | 10/2017 | |
| CN | 107630610 | A | | 1/2018 | |
| CN | 107883661 | A | | 4/2018 | |
| CN | 107883662 | A | | 4/2018 | |
| CN | 108106312 | A | | 6/2018 | |
| CN | 108253711 | A | | 7/2018 | |
| CN | 108286860 | A | | 7/2018 | |
| CN | 108302856 | A | | 7/2018 | |
| CN | 108468488 | A | | 8/2018 | |
| CN | 108661470 | A | | 10/2018 | |
| CN | 108868422 | A | | 11/2018 | |
| CN | 109470000 | A | | 3/2019 | |
| CN | 109470019 | A | | 3/2019 | |
| CN | 208605065 | U | | 3/2019 | |
| CN | 110068185 | A | | 7/2019 | |
| CN | 110068186 | A | | 7/2019 | |
| DE | 102005047080 | B3 | * | 11/2006 | E05D 3/022 |
| DE | 102011116573 | A1 | | 4/2012 | |
| DE | 102006025815 | B4 | | 9/2013 | |
| EP | 3026375 | A1 | | 6/2016 | |
| EP | 2960411 | B1 | | 8/2019 | |
| GB | 2128244 | B | | 11/1985 | |
| JP | 2527475 | B2 | * | 8/1996 | |
| JP | 2000-18812 | A | | 1/2000 | |
| JP | 2002250171 | A | * | 9/2002 | |
| JP | 2005146625 | A | * | 6/2005 | |
| JP | 2005-299314 | A | | 10/2005 | |
| JP | 2009-114710 | A | | 5/2009 | |
| JP | 2013-7193 | A | | 1/2013 | |
| JP | 2013-91900 | A | | 5/2013 | |
| JP | 2013-256829 | A | | 12/2013 | |
| JP | 6062164 | B2 | | 1/2017 | |
| KR | 10-2010-0054353 | A | | 5/2010 | |
| KR | 10-2010-0107161 | A | | 10/2010 | |
| WO | 2006/098591 | A1 | | 9/2006 | |

* cited by examiner

FREE EMBEDDED REFRIGERATOR

The present application is a 35 U.S.C. § 371 National Phase conversion of International (PCT) Patent Application No. PCT/CN2020/111596, filed on Aug. 27, 2020, which claims priority to Chinese Patent Application No. 201910803454.5, entitled "Free Embedded Refrigerator", filed on Aug. 28, 2019, Chinese Patent Application No. 201910803353.8, entitled "Refrigerator with Hinge Assembly", filed on Aug. 28, 2019, Chinese Patent Application No. 202010179525.1, entitled "Free Embedded Refrigerator", filed on Mar. 16, 2020, and Chinese Patent Application No. 202010179527.0, entitled "Refrigerator with Hinge Assembly", filed on Mar. 16, 2020, the disclosures of which are incorporated herein by reference in their entirety. The PCT International Patent Application was filed and published in Chinese.

TECHNICAL FIELD

The present invention relates to the field of household appliance technologies, and in particular, to a free embedded refrigerator.

BACKGROUND

Usually, a refrigerator and a door move relatively by means of a fixed hinge part, thus greatly limiting an opening-closing freedom degree of the door; that is, a motion track of the door is unable to be freely controlled to adapt to different application scenarios.

For example, in recent years, with progress of society and an improvement of people's living standard, placement positions and modes of the refrigerators in homes are more and more emphasized by common users, and for current home decoration styles, part of the homes pursue style integration, the refrigerator is required to be placed in a cupboard to form a so-called embedded refrigerator device, which may adapt to home integration, smart home, or the like; the refrigerator is called an embedded refrigerator, and the current refrigerator is difficult to adapt to the embedded application scenario.

In view of this, the existing refrigerator is necessary to be improved to solve the above-mentioned problem.

SUMMARY

An object of the present invention is to provide a free embedded refrigerator which may effectively increase an opening-closing freedom degree of a door.

To implement one of the above inventive objectives, an embodiment of the present invention provides a free embedded refrigerator, including: a cabinet, a door for opening and closing the cabinet, and a hinge assembly for connecting the cabinet and the door, the hinge assembly includes a first hinge part, a second hinge part and a switching assembly connected with the first hinge part and the second hinge part; when the door is in an opening process, the first hinge part moves relative to the switching assembly to drive the door to rotate in situ relative to the cabinet, and then, the switching assembly drives the second hinge part to move relative to the switching assembly to drive the door to continuously rotate in situ.

As a further improvement of an embodiment of the present invention, the first hinge part is fixed to the cabinet, the second hinge part is fixed to the door, and the switching assembly includes a first fitting part and a second fitting part; when the door is opened from a closed state to a first opening angle, the first hinge part and the first fitting part move relatively to drive the door to rotate in situ relative to the cabinet, and the second fitting part limits the second hinge part; when the door is continuously opened from the first opening angle to a second opening angle, the second hinge part is released from the limit of the second fitting part, and the first fitting part limits the first hinge part; when the door is continuously opened from the second opening angle to a maximum opening angle, the second hinge part and the second fitting part move relatively to drive the door to continuously rotate in situ.

As a further improvement of an embodiment of the present invention, the switching assembly includes a first switching part and a second switching part which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second hinge part is released from the limit of the second fitting part, and the first fitting part limits the first hinge part.

As a further improvement of an embodiment of the present invention, the first hinge part and the first fitting part move relatively by a first shaft set and a first groove set which are fitted with each other, and the second hinge part and the second fitting part move relatively by a second shaft set and a second groove set which are fitted with each other; the first shaft set includes a first shaft and a second shaft, the first groove set includes a first groove fitted with the first shaft and a second groove fitted with the second shaft, the second shaft set includes a third shaft and a fourth shaft, and the second groove set includes a third groove fitted with the third shaft and a fourth groove fitted with the fourth shaft.

As a further improvement of an embodiment of the present invention, the first hinge part and the first fitting part move relatively by a first shaft and a first groove which are fitted with each other, and the second hinge part and the second fitting part move relatively by a second shaft set and a second groove set which are fitted with each other; the second shaft set includes a third shaft and a fourth shaft, and the second groove set includes a third groove fitted with the third shaft and a fourth groove fitted with the fourth shaft.

As a further improvement of an embodiment of the present invention, the first hinge part includes the first shaft, the first fitting part includes the first groove, the second fitting part includes the third shaft and the fourth shaft, and the second hinge part includes the third groove and the fourth groove.

As a further improvement of an embodiment of the present invention, the first hinge part includes a first limiting portion, the first switching part includes a second limiting portion, the first groove includes a first upper groove located at the first switching part and a first lower groove located at the second switching part, and the fourth groove includes a fourth free section and a limiting section; when the door is opened from the closed state to the first opening angle, the first switching part and the second switching part are relatively stationary, a first free section is formed by overlapped parts of the first upper groove and the first lower groove, the first shaft rotates in situ in the first free section, and the second limiting portion abuts against the first limiting portion, such that the switching assembly limits the first hinge part; the fourth shaft is limited on the limiting section, such that the switching assembly limits the second hinge part; when the door is continuously opened from the first opening angle to the second opening angle, the first switching part and the second switching part move relatively, such that the fourth shaft is separated from the limiting section; when the door is continuously opened from the second opening angle to the maximum opening angle, the third shaft rotates in situ in the third groove, and the fourth shaft moves in the fourth free section around the third shaft.

As a further improvement of an embodiment of the present invention, one of the first limiting portion and the second limiting portion is configured as a bump, the other is configured as a recess, the bump includes a first limiting surface, and the recess includes a second limiting surface; when the door is in the closed state, the first limiting surface is apart from the second limiting surface, and when the door is opened from the closed state to the first opening angle, the first limiting surface and the second limiting surface gradually approach until the first limiting surface abuts against the second limiting surface.

As a further improvement of an embodiment of the present invention, the recess is located on the first switching part, and the bump is located on the first hinge part.

As a further improvement of an embodiment of the present invention, an opening size of the first upper groove is matched with a size of the first shaft, and an opening size of the first lower groove is greater than the opening size of the first upper groove.

As a further improvement of an embodiment of the present invention, the first switching part includes a first stopper, the second switching part includes a second stopper fitted with the first stopper, and when the door is closed from the second opening angle to the first opening angle, the second switching part limits movement of the first switching part by fitting the second stopper with the first stopper.

As a further improvement of an embodiment of the present invention, the cabinet includes an accommodating chamber and an outer side surface adjacent to the hinge assembly and on an extension section of a rotation path of the door, the door includes a front wall apart from the accommodating chamber and a side wall always clamped between the front wall and the accommodating chamber, and a side edge is provided between the front wall and the side wall; a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged, and when the door is continuously opened from the second opening angle to the maximum opening angle, the fourth pitch, the fifth pitch and the sixth pitch are all kept unchanged.

As a further improvement of an embodiment of the present invention, the first switching part and the second switching part are fitted and connected with each other by a fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the a free embedded refrigerator further includes an outer side surface adjacent to the hinge assembly and on the extension section of the rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

To implement one of the above inventive objectives, an embodiment of the present invention provides a free embedded refrigerator, including: a cabinet, a door for opening and closing the cabinet, and a hinge assembly for connecting the cabinet and the door, wherein the hinge assembly includes a first hinge part fixed to the cabinet, a second hinge part fixed to the door and a switching assembly connected with the first hinge part and the second hinge part; the first hinge part and the switching assembly move relatively by a first shaft and a first groove which are fitted with each other, and the first groove includes a first free section; the second hinge part and the switching assembly move relatively by a second shaft set and a second groove set which are fitted with each other; the second shaft set includes a third shaft and a fourth shaft, and the second groove set includes a third free section, a fourth free section and a limiting section; when the door is in a closed state, the first shaft is located at the first free section, and the fourth shaft is located at the limiting section, such that the switching assembly limits the second hinge part; when the door is opened to a first opening angle from the closed state, the first shaft rotates in situ in the first free section to drive the door to rotate in situ relative to the cabinet; when the door is continuously opened from the first opening angle to a second opening angle, the fourth shaft is separated from the limiting section, and the switching assembly limits the first hinge part; when the door is continuously opened from the second opening angle to a maximum opening angle, the third shaft rotates in situ in the third free section, the fourth shaft moves in the fourth free section around the third shaft, and the door continuously rotates in situ relative to the cabinet.

As a further improvement of an embodiment of the present invention, the third free section and the third shaft are fitted with each other.

As a further improvement of an embodiment of the present invention, the first hinge part includes the first shaft, the switching assembly includes the first groove, the third shaft and the fourth shaft, and the second hinge part includes a third groove with the third free section and a fourth groove with the fourth free section and the limiting section.

As a further improvement of an embodiment of the present invention, the switching assembly includes a first switching part and a second switching part which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the fourth shaft is separated from the limiting section.

As a further improvement of an embodiment of the present invention, the first hinge part includes a first limiting portion, the first switching part includes a second limiting portion, and the first groove includes a first upper groove located at the first switching part and a first lower groove located at the second switching part; when the door is opened from the closed state to the first opening angle, a first free section is formed by overlapped parts of the first upper groove and the first lower groove, the first shaft rotates in situ in the first free section, and the second limiting portion abuts against the first limiting portion, such that the switching assembly limits the first hinge part; when the door is continuously opened from the first opening angle to the second opening angle, the first switching part moves relative to the second switching part, such that the fourth shaft is separated from the limiting section.

As a further improvement of an embodiment of the present invention, one of the first limiting portion and the second limiting portion is configured as a bump, the other is configured as a recess, the bump includes a first limiting surface, and the recess includes a second limiting surface; when the door is in the closed state, the first limiting surface is apart from the second limiting surface, and when the door is opened from the closed state to the first opening angle, the first limiting surface and the second limiting surface gradually approach until the first limiting surface abuts against the second limiting surface.

As a further improvement of an embodiment of the present invention, the recess is located on the first switching part, and the bump is located on the first hinge part.

As a further improvement of an embodiment of the present invention, an opening size of the first upper groove is matched with a size of the first shaft, and an opening size of the first lower groove is greater than the opening size of the first upper groove.

As a further improvement of an embodiment of the present invention, the first switching part includes a first stopper, the second switching part includes a second stopper fitted with the first stopper, and when the door is closed from the second opening angle to the first opening angle, the second switching part limits movement of the first switching part by fitting the second stopper with the first stopper.

As a further improvement of an embodiment of the present invention, the first switching part and the second switching part are fitted and connected with each other by a fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on the extension section of the rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance As a further improvement of an embodiment of the present invention, the door is provided with a first fitting portion, the cabinet is provided with a second fitting portion, the first fitting portion and the second fitting portion are engaged with each other when the door is in the closed state, and when the door is opened from the closed state to the first opening angle, the hinge assembly drives the door to rotate in situ relative to the cabinet, so as to drive the first fitting portion to be disengaged from the second fitting portion.

As a further improvement of an embodiment of the present invention, the cabinet includes an accommodating chamber, the door includes a first door and a second door, the first door and the second door are pivotally connected with the cabinet and arranged side by side in a horizontal direction, the refrigerator further includes a vertical beam movably connected to a side of the first door close to the second door, the first fitting portion is provided at the vertical beam, and when the door is in the closed state, the vertical beam extends to the second door; when the door is opened from the closed state to the first opening angle, the door rotates in situ relative to the cabinet, such that the vertical beam rotates towards a side close to the accommodating chamber, a first folding angle is formed between the first door and the vertical beam, and then, the vertical beam and the first door are kept relatively static.

As a further improvement of an embodiment of the present invention, the first fitting portion is configured as a bump protruding upwards from the vertical beam, the second fitting portion is configured as a groove with a notch, and the bump enters or leaves the groove through the notch.

As a further improvement of an embodiment of the present invention, the cabinet further includes an accommodating chamber and a fixed beam dividing the accommodating chamber into a first compartment and a second compartment, and the door includes a first door provided corresponding to the first compartment and a second door provided corresponding to the second compartment; when the door is in the closed state, both the first door and the second door contact the fixed beam, and when the door is opened from the closed state to the first opening angle, the hinge assembly drives the door to rotate in situ relative to the cabinet, so as to drive the door to be separated from the fixed beam.

Compared with a prior art, the present invention has the following beneficial effects: with the refrigerator according to an embodiment of the present invention, the opening-closing freedom degree of the door may be increased, and various motion tracks may be generated to adapt to different application scenarios.

DETAILED DESCRIPTION

Figure 1:
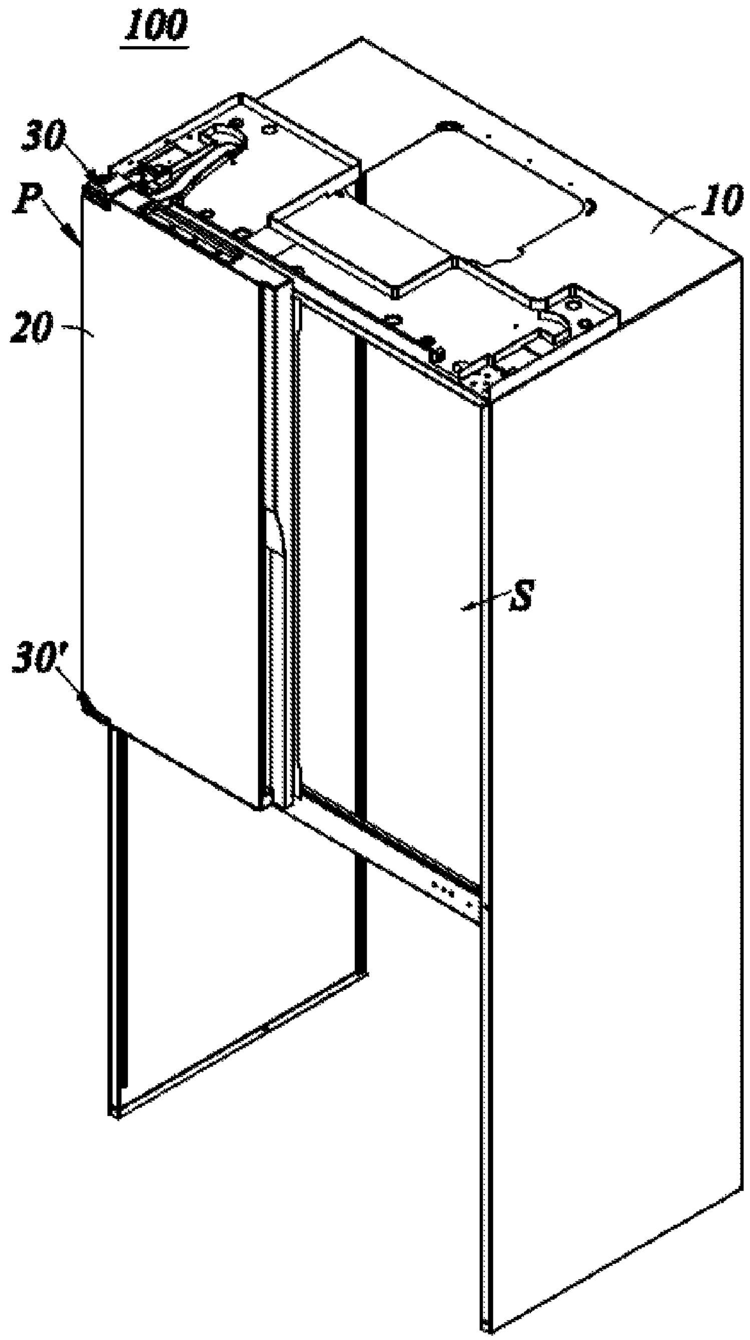
FIG. 1 is a perspective view of a refrigerator according to an embodiment of the present invention.
Figure 2:
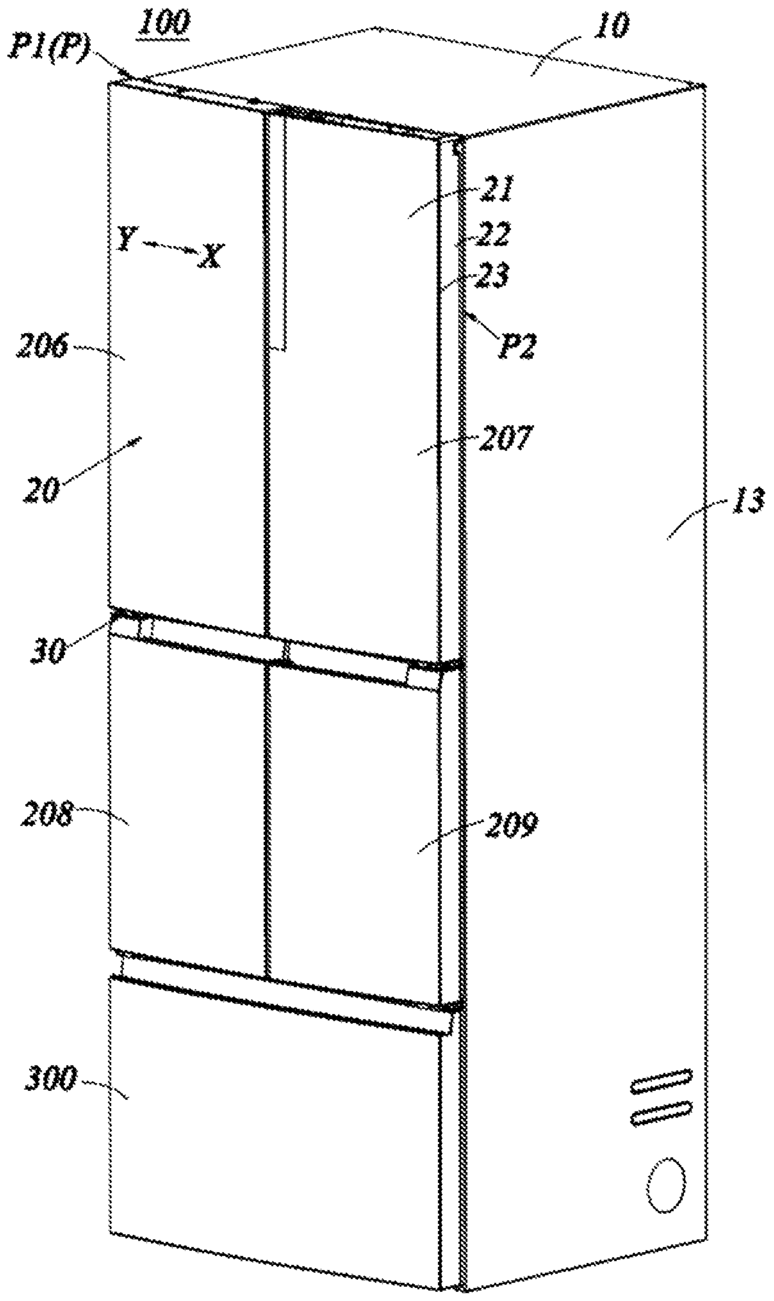
FIG. 2 is a perspective view of a multi-door refrigerator according to an embodiment of the present invention.
Figure 3:
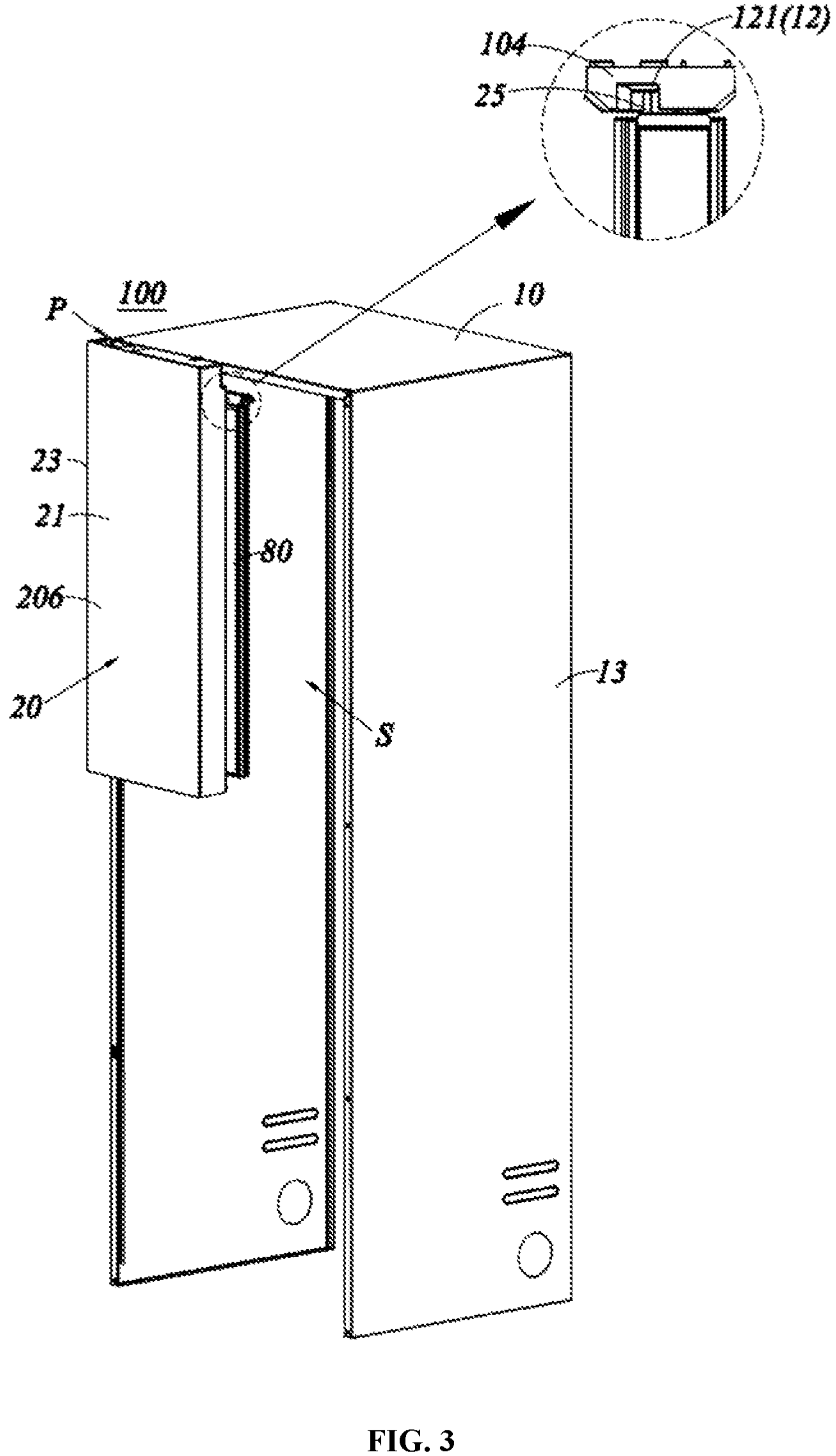
FIG. 3 is a schematic diagram of a multi-door refrigerator according to an embodiment of the present invention in a closed state.
Figure 4:
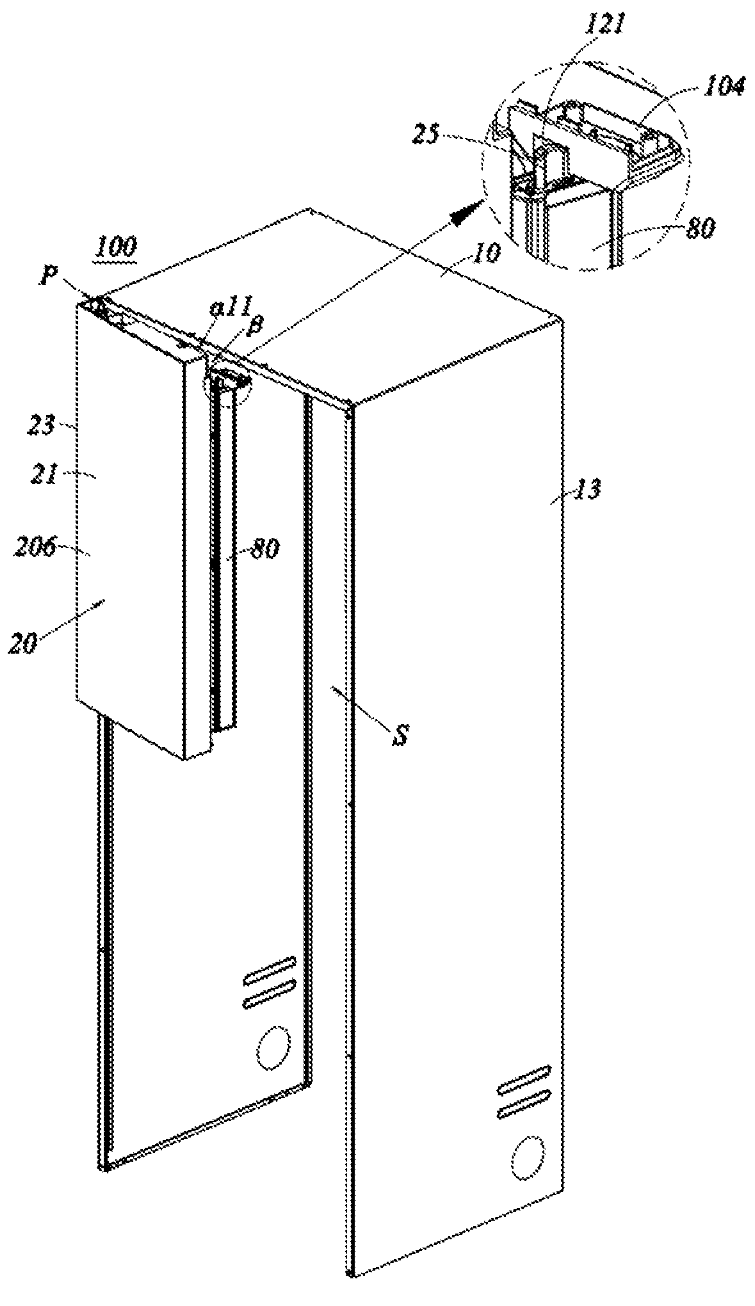
FIG. 4 is a schematic diagram of a multi-door refrigerator according to an embodiment of the present invention opened to a first intermediate opening angle.
Figure 5:
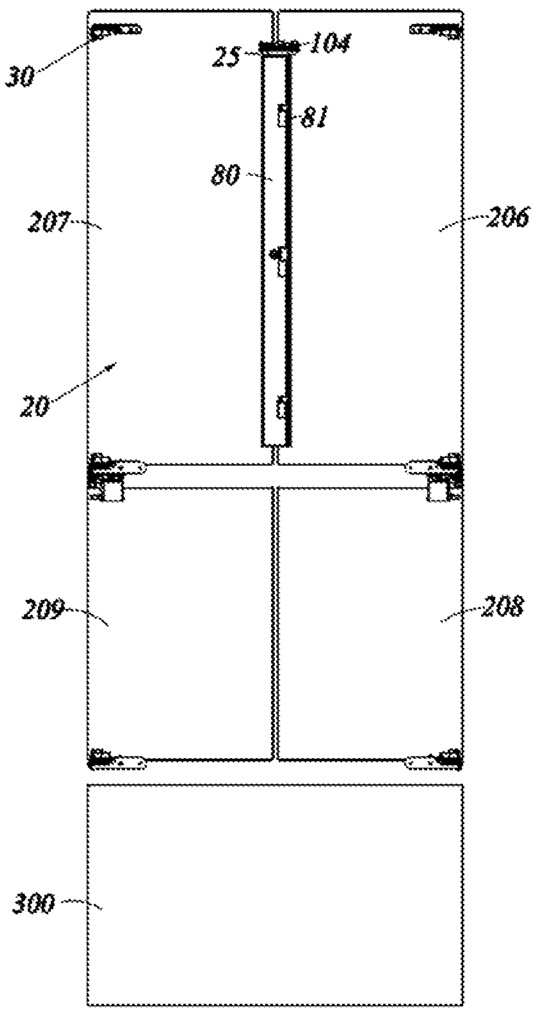
FIG. 5 is a rear view of a multi-door refrigerator according to an embodiment of the present invention (with some elements omitted)
Figure 6:
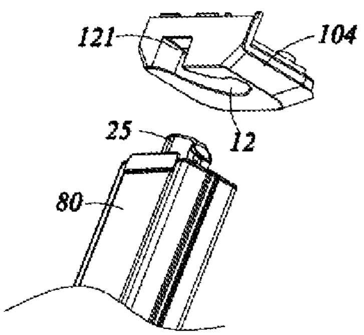
FIG. 6 is an exploded view of a first fitting portion and a second fitting portion according to an embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "above" other units or features are "below" other units or features. Therefore, the exemplary term "above" may include both the "above" and "below" orientations. The device may be oriented (rotated by 90 degrees or other orientations) in other ways, correspondingly explaining the expressions related to the space herein.

In the present embodiment, referring to FIGS. 1 to 13, a refrigerator 100 includes a cabinet 10, a door 20 for opening and closing the cabinet 10, and a hinge assembly 30 for connecting the cabinet 10 and the door 20.

The hinge assembly 30 includes a first hinge part 31, a second hinge part 32 and a switching assembly 40 connected with the first hinge part 31 and the second hinge part 32. When the door 20 is in an opening process, the first hinge part 31 moves relative to the switching assembly 40 to drive the door 20 to rotate in situ relative to the cabinet 10, and then, the switching assembly 40 drives the second hinge part 32 to move relative to the switching assembly 40 to drive the door 20 to continuously rotate in situ.

In the present embodiment, the first hinge part 31 and the second hinge part 32 may be switched by the switching assembly 33, the door 20 may rotate in situ plural times by the first hinge part 31 and the second hinge part 32, and rotation axes of the plural times of in-situ rotation may be freely selected to adapt to plural application scenarios.

In the present embodiment, the first hinge part 31 is fixed to the cabinet 10, the second hinge part 32 is fixed to the door 20, and the switching assembly 40 includes a first fitting part 41 and a second fitting part 42.

When the door 20 is opened from a closed state to a first opening angle α1, the first hinge part 31 and the first fitting part 41 move relatively to drive the door 20 to rotate in situ relative to the cabinet 10, and the second fitting part 42 limits the second hinge part 32; when the door 20 is continuously opened from the first opening angle α1 to a second opening angle α2, the second hinge part 32 is released from the limit of the second fitting part 42, and the first fitting part 41 limits the first hinge part 31; when the door 20 is continuously opened from the second opening angle α2 to a maximum opening angle α3, the second hinge part 32 and the second fitting part 42 move relatively to drive the door 20 to continuously rotate in situ.

That is, in the present example, the first hinge part 31 and the first fitting part 41 are fitted to implement the in-situ rotation of the door 20, the second hinge part 32 and the second fitting part 42 are fitted to implement the continuous in-situ rotation of the door 20, and the first hinge part 31 and the second hinge part 32 operate in sequence by means of locking and unlocking functions of the switching assembly 40.

In a first combination, the first hinge part 31 and the first fitting part 41 move relatively by a first shaft 311 and a first groove 411 which are fitted with each other, and the second hinge part 32 and the second fitting part 42 move relatively by a second shaft set 321, 322 and a second groove set 421, 422 which are fitted with each other; the second shaft set 321, 322 includes a third shaft 321 and a fourth shaft 322, and the second groove set 421, 422 includes a third groove 421 fitted with the third shaft 321 and a fourth groove 422 fitted with the fourth shaft 322.

That is, in the present example, the first hinge part 31 and the first fitting part 41 are fitted to implement the in-situ rotation of the door 20, the second hinge part 32 and the second fitting part 42 are fitted to implement the continuous in-situ rotation of the door 20, and the first hinge part 31 and the second hinge part 32 operate in sequence by means of the locking and unlocking functions of the switching assembly 40.

In addition, in the present example, the first hinge part 31 and the first fitting part 41 are fitted by a single shaft and a single groove to implement the in-situ rotation, thus greatly simplifying a structure.

In a second combination, the first hinge part 31 and the first fitting part 41 move relatively by a first shaft set and a first groove set which are fitted with each other, the first shaft set includes a first shaft and a second shaft, and the first groove set includes a first groove fitted with the first shaft and a second groove fitted with the second shaft; the second hinge part 32 and the second fitting part 42 move relatively by a second shaft set 321, 322 and a second groove set 421, 422 which are fitted with each other; the second shaft set 321, 322 includes a third shaft 321 and a fourth shaft 322, and the second groove set 421, 422 includes a third groove 421 fitted with the third shaft 321 and a fourth groove 422 fitted with the fourth shaft 322.

That is, in the present example, the first hinge part 31 and the first fitting part 41 are fitted to implement the in-situ rotation of the door 20, the second hinge part 32 and the second fitting part 42 are fitted to implement the continuous in-situ rotation of the door 20, and the first hinge part 31 and the second hinge part 32 operate in sequence by means of the locking and unlocking functions of the switching assembly 40.

In addition, in the present example, the first hinge part 31 and the first fitting part 41 are fitted by double shafts and double grooves to implement the in-situ rotation; for example, the first shaft rotates in situ in the first groove, and the second shaft moves in the second groove around the first shaft.

Hereinafter, the refrigerator 100 according to the present embodiment will be described with the first combination as an example.

FIG. 1 is a schematic diagram of a refrigerator 100 according to an embodiment of the present invention.

The refrigerator 100 includes a cabinet 10, a door 20 for opening and closing the cabinet 10, and a hinge assembly 30 for connecting the cabinet 10 and the door 20.

It should be emphasized that a structure in the present embodiment is applicable to not only the refrigerator 100 with the hinge assembly 30, but also other scenarios, such as a cupboard, a wine cabinet, a wardrobe, or the like.

Referring to FIGS. 2 to 13, the hinge assembly 30 includes a first hinge part 31 fixed to the cabinet 10, a second hinge part 32 fixed to the door 20 and a switching assembly 40 connected with the first hinge part 31 and the second hinge part 32.

The first hinge part 31 and the switching assembly 40 move relatively by a first shaft 311 and a first groove 411 which are fitted with each other, and the first groove 411 includes a first free section 51.

The second hinge part 32 and the switching assembly 40 move relatively by a second shaft set 321, 322 and a second groove set 421, 422 which are fitted with each other; the second shaft set 321, 322 includes a third shaft 321 and a fourth shaft 322, and the second groove set 421, 422 includes a third free section 421, a fourth free section 4221 and a limiting section 4222.

When the door 20 is in a closed state (referring to FIGS. 14 to 17), the first shaft 311 is located at the first free section 51, and the fourth shaft 322 is located at the limiting section 4222, such that the switching assembly 40 limits the second hinge part 32.

When the door 20 is opened to a first opening angle α1 from the closed state (referring to FIGS. 18 to 21), the first shaft 311 rotates in situ in the first free section 51 to drive the door 20 to rotate in situ relative to the cabinet 10.

When the door 20 is continuously opened from the first opening angle α1 to a second opening angle α2 (referring to FIGS. 22 to 25), the fourth shaft 322 is separated from the limiting section 4222, and the switching assembly 40 limits the first hinge part 31.

When the door 20 is continuously opened from the second opening angle α2 to a maximum opening angle α3 (referring to FIGS. 26 to 29), the third shaft 321 rotates in situ in the third free section 421, the fourth shaft 322 moves in the fourth free section 422 around the third shaft 321, and the door 20 continuously rotates in situ relative to the cabinet 10.

It should be noted that in one example, referring to FIGS. 2 to 6, the door 20 is provided with a first fitting portion 25, the cabinet 10 is provided with a second fitting portion 12, and when the door 20 is in the closed state, the first fitting portion 25 and the second fitting portion 12 are engaged with each other; when the door 20 is opened to the first opening angle α1 from the closed state, the hinge assembly 30 drives the door 20 to rotate in situ relative to the cabinet 10, so as to drive the first fitting portion 25 to be disengaged from the second fitting portion 12.

Here, the door 20 rotates in situ relative to the cabinet 10; that is, the door 20 only rotates without generating displacement in other directions, thus effectively avoiding that the first fitting portion 25 is unable to be disengaged from the second fitting portion 12 due to the displacement in a certain direction of the door 20.

It should be noted that the refrigerator 100 according to the present embodiment may be a single-door refrigerator having the first fitting portion 25 and the second fitting portion 12, or a side-by-side refrigerator, a multi-door refrigerator, or the like, having the first fitting portion 25 and the second fitting portion 12.

The door 20 includes a first door 206 and a second door 207 pivotally connected with the cabinet 10 and arranged side by side in a horizontal direction.

The refrigerator 100 further includes a vertical beam 80 movably connected to a side of the first door 206 close to the second door 207, and the first fitting portion 25 is provided at the vertical beam 80.

Here, the vertical beam 80 is movably connected to a right side of the first door 206, the vertical beam 80 and the first door 206 may be connected by a return spring 81, and the vertical beam 80 rotates relative to the first door 206 around an axis in a vertical direction; in other words, under the action of the return spring 81, the vertical beam 80 may rotate relative to the first door 206 and be kept at a predetermined position.

The first fitting portion 25 is configured as a bump 25 protruding upwards from the vertical beam 80.

The second fitting portion 12 is fixedly provided on the cabinet 10; for example, the second fitting portion 12 is configured as a groove 12 in a base 104, the base 104 is fixedly provided at a top of an accommodating chamber S, a notch 121 is provided in an end of the groove 12, the notch 121 has a forward opening, the bump 25 and the groove 12 are both arc-shaped, and the bump 25 enters or leaves the groove 12 through the notch 121 to achieve mutual limitation and separation of the bump 25 and the groove 12.

Certainly, it may be understood that specific structures of the first and second fitting portions 25, 12 are not limited to the above description; that is, the first fitting portion 25 is not limited to the bump 25 at the vertical beam 80, the second fitting portion 12 is not limited to the groove 12 fitted with the bump 25, and the first and second fitting portions 25, 12 may be configured as structures fitted with each other in other regions of the refrigerator 100.

In the present example, the door 20 further includes a third door 208 and a fourth door 209 pivotally connected to the cabinet 10 and arranged side by side in the horizontal direction, the third door 208 is located below the first door 206, the fourth door 209 is located below the second door 207, and the refrigerator 100 further includes a drawer 300 located below the third door 208 and the fourth door 209.

Here, the accommodating chamber S corresponding to the first door 206 and the second door 207 is configured as a refrigerating chamber; that is, the refrigerating chamber has a side-by-side structure; the third door 208 and the fourth door 209 correspond to two independent variable temperature compartments respectively; the drawer 300 is configured as a freezing drawer.

It should be noted that the refrigerator 100 includes a fixed beam fixed inside the cabinet 10 and configured to separate the two variable temperature compartments, and the third door 208 and the fourth door 209 may be fitted with the fixed beam to achieve a sealing effect; that is, at this point, no vertical beam is required to be provided at the third door 208 and the fourth door 209.

Figure 7:
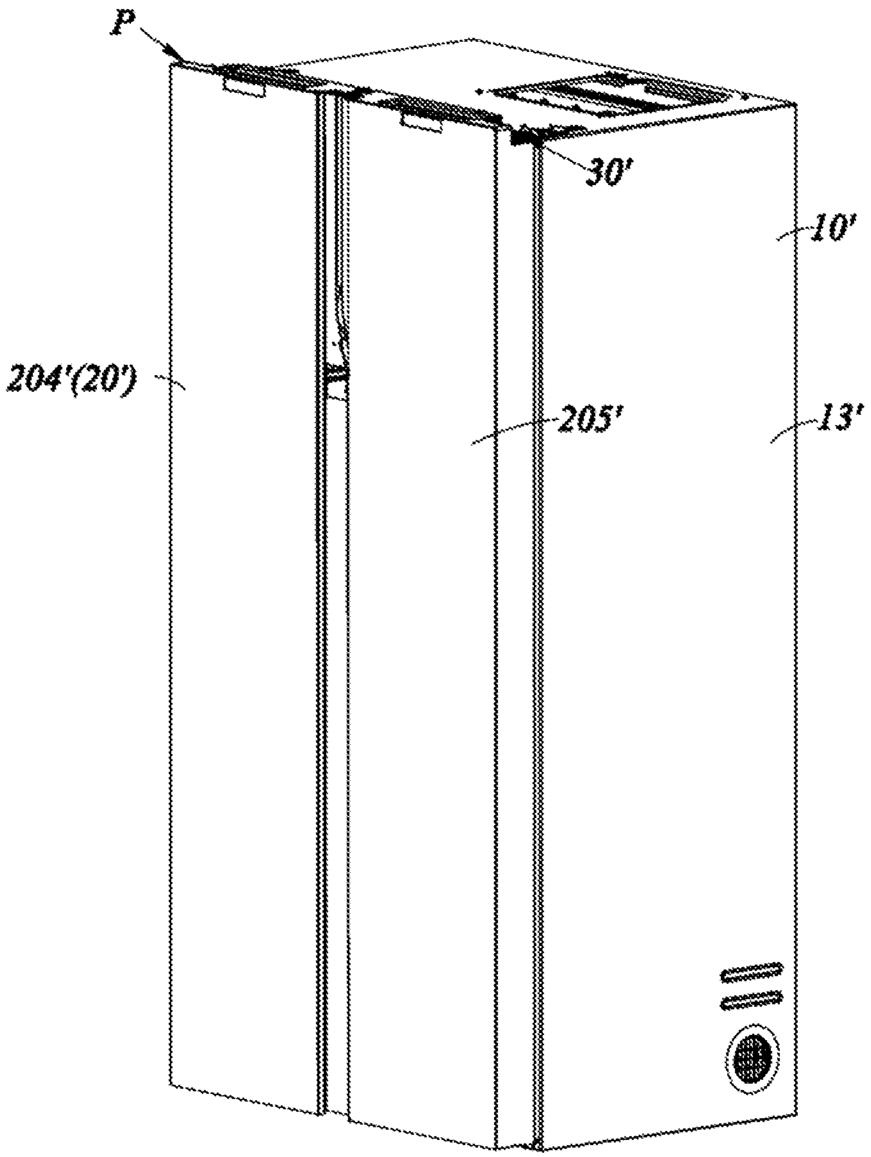
FIG. 7 is a schematic diagram of a side-by-side refrigerator according to an embodiment of the present invention.
Figure 8:
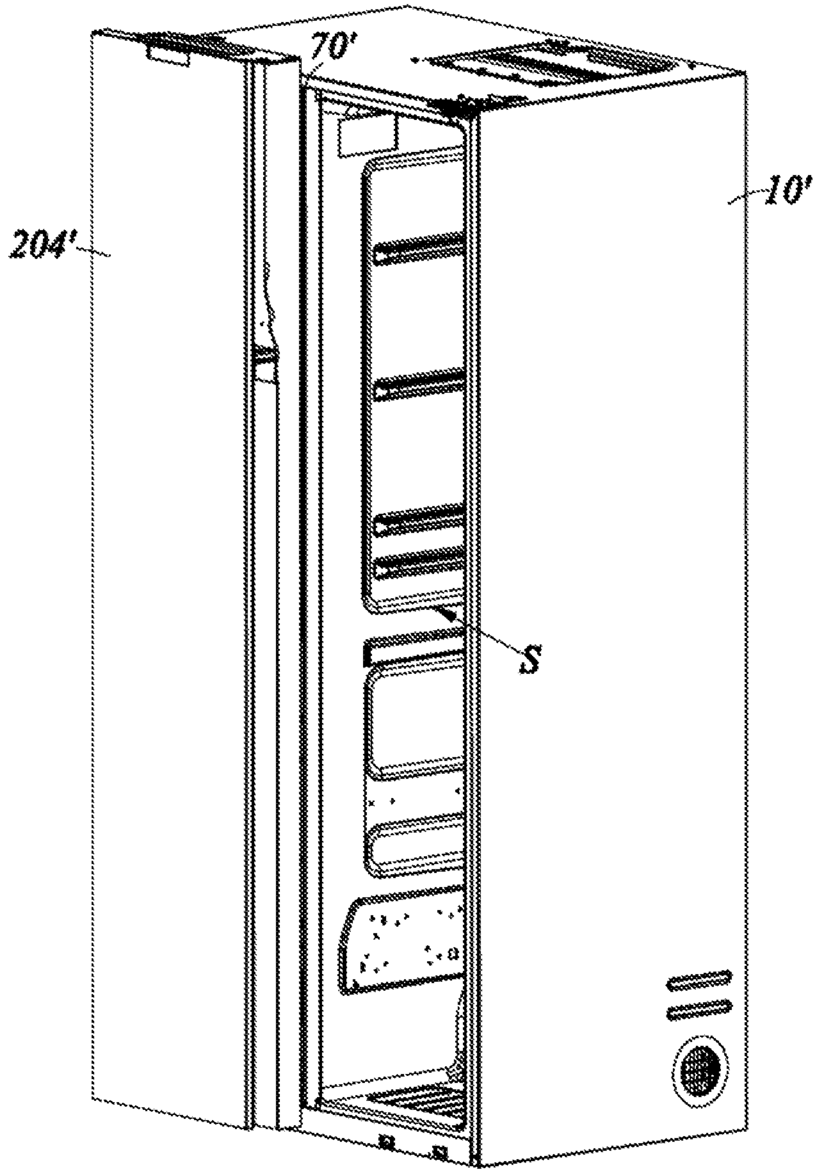
FIG. 8 is a schematic diagram of a side-by-side refrigerator according to an embodiment of the present invention with a second door omitted.
Figure 9:
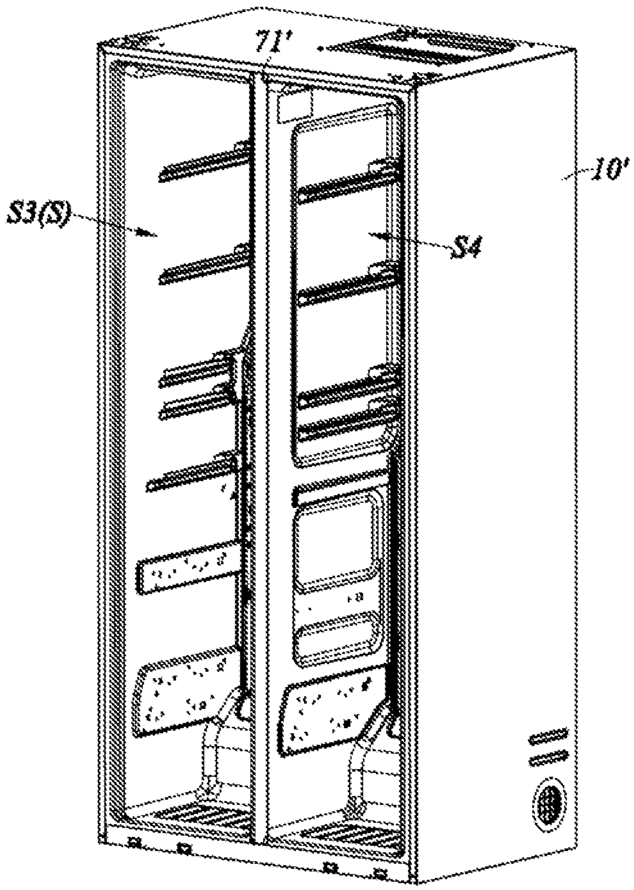
FIG. 9 is a schematic diagram of a side-by-side refrigerator according to an embodiment of the present invention with a door omitted.
Figure 10:
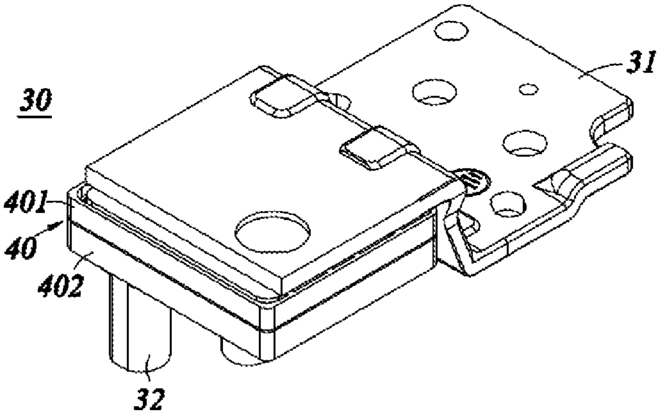
FIG. 10 is a perspective view of a hinge assembly in an embodiment of the present invention in a closed state.
Figure 11:
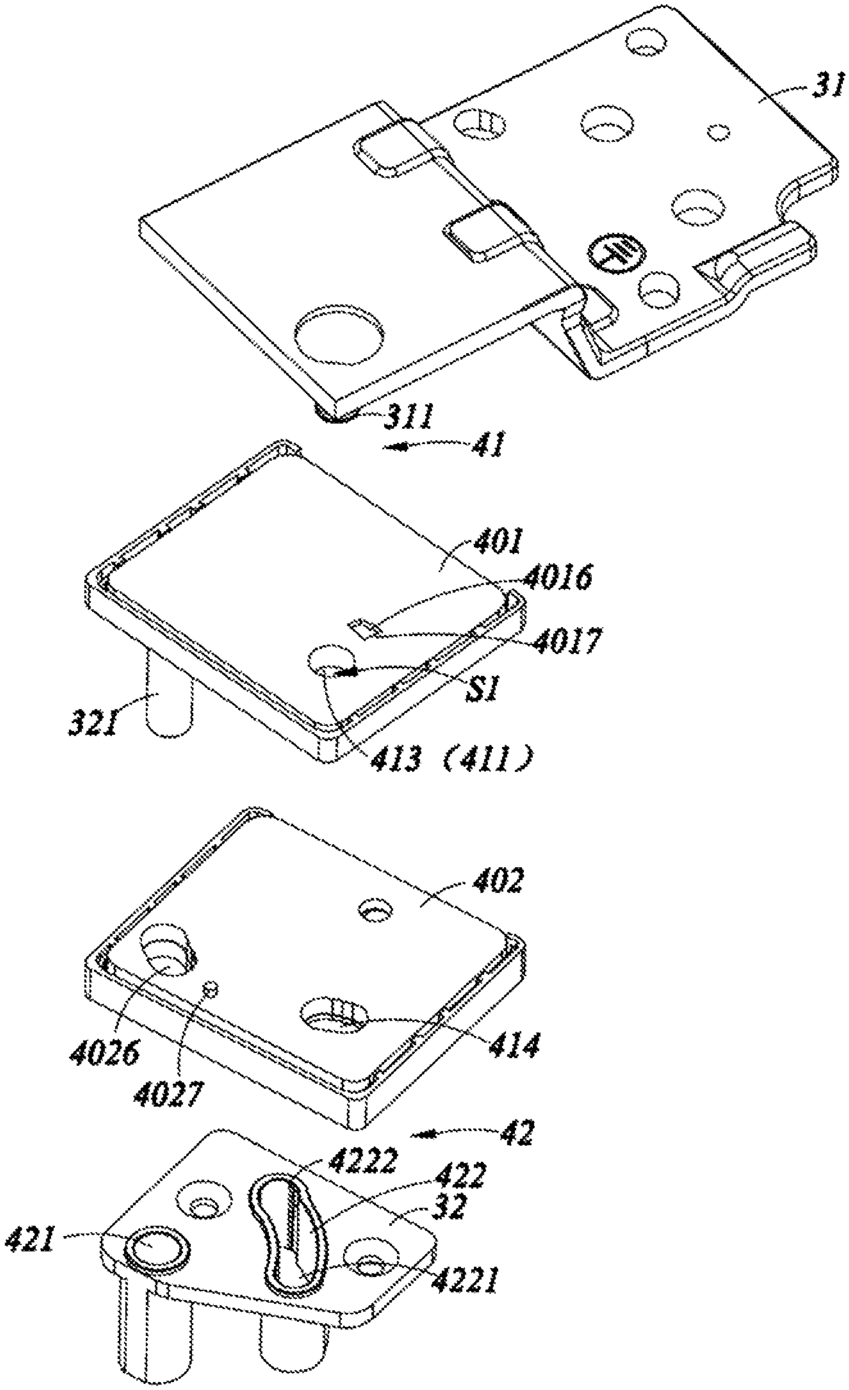
FIGS. 11 to 13 are exploded views of a hinge assembly in an embodiment of the present invention in different states.
Figure 12:
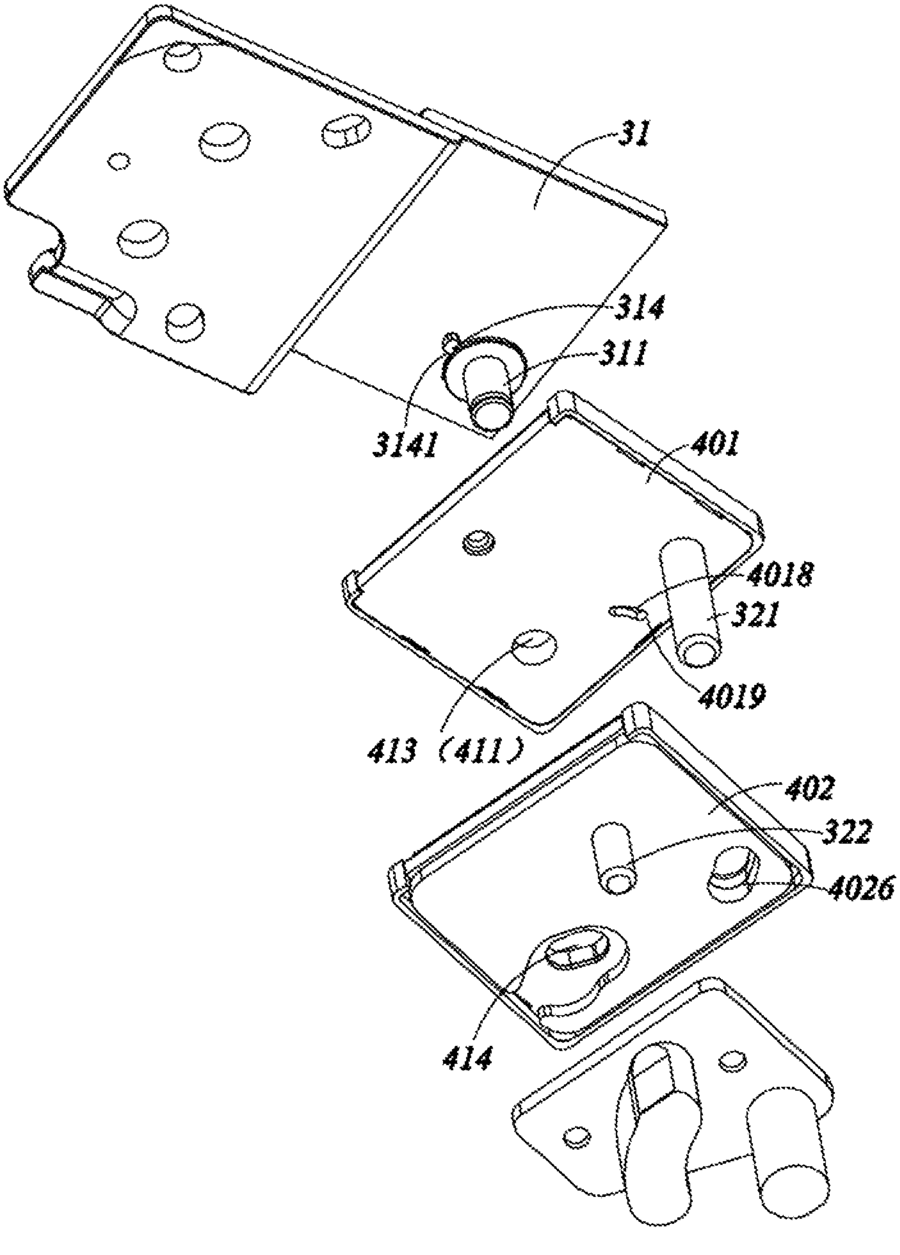

In another example, with reference to FIGS. 7 to 9, the cabinet 10' includes a fixed beam 70' dividing the accommodating chamber S into a first compartment S3 and a second compartment S4, and the door 20' includes a first door 204' provided corresponding to the first compartment S3' and a second door 205' provided corresponding to the second compartment S4; when the door 20' is in the closed state, both the first door 204' and the second door 205' contact the fixed beam 70', and when the door 20' is opened from the closed state to the first opening angle $\alpha$1, the hinge assembly 30' drives the door 20' to rotate in situ relative to the cabinet 10', so as to drive the door 20' to be separated from the fixed beam 70'.

Here, door gaskets may be provided on sides of the first door 204' and the second door 205' close to the cabinet 10', and when the door 20' is in the closed state, the door gasket contacts a contact surface 71' of the fixed beam 70' to completely close the door 20', so as to prevent cold air in the cabinet 10' from leaking.

When opened to the first opening angle $\alpha$1 from the closed state, the door 20' rotates in situ relative to the cabinet 10'; that is, the door 20' only rotates without generating displacement in other directions, thus effectively avoiding that the door 20' is unable to be normally opened due to displacement in a certain direction of the door 20'.

At this point, when the first door 204' is displaced horizontally when opened, the first door 204' and the second door 205' are unable to be opened normally due to interference therebetween, but the first door 204' and the second door 205' rotate in situ when the refrigerator 100' according to the present embodiment is opened, thus effectively avoiding the interference between the adjacent first and second doors 204', 205'.

With continued reference to FIGS. 10 to 13, the first hinge part 31 includes a first shaft 311, the switching assembly 40 includes a first groove 411, a third shaft 321 and a fourth shaft 322, and the second hinge part 32 includes a third groove 421 having a third free section 421 and a fourth groove 422 having a fourth free section 4221 and a limiting section 4222.

In the present embodiment, the first fitting part 41 and the second fitting part 42 are specifically configured as a first switching part 401 and a second switching part 402 which are fitted with each other; that is, the switching assembly 40 includes the first switching part 401 and the second switching part 402 which are fitted with each other, but the present invention is not limited thereto.

The first hinge part 31 includes a first limiting portion 314, the first switching part 401 includes a second limiting portion 4016, one of the first limiting portion 314 and the second limiting portion 4016 is configured as a bump 314, the other is configured as a recess 4016, the bump 314 includes a first limiting surface 3141, and the recess 4016 includes a second limiting surface 4017.

In the present embodiment, the recess 4016 is located on the first switching part 401, and the bump 314 is located on the first hinge part 314.

In other embodiments, positions of the bump 314 and the recess 4016 may be interchanged, and other limiting structures may be adopted.

The first groove 411 includes a first upper groove 413 located at the first switching part 401 and a first lower groove 414 located at the second switching part 402, and the first free section Si includes the first upper groove 413 and the first lower groove 414.

An opening size of the first upper groove 413 is matched with a size of the first shaft 311, and an opening size of the first lower groove 414 is greater than the opening size of the first upper groove 413.

Here, the first upper groove 413 is circular, and the first lower groove 414 is oval, but the present invention is not limited thereto.

In the present embodiment, the first switching part 401 is closer to the first hinge part 31 than the second switching part 402; that is, the first hinge part 31, the first switching part 401, the second switching part 402 and the second hinge part 32 are stacked in sequence.

Figure 13:
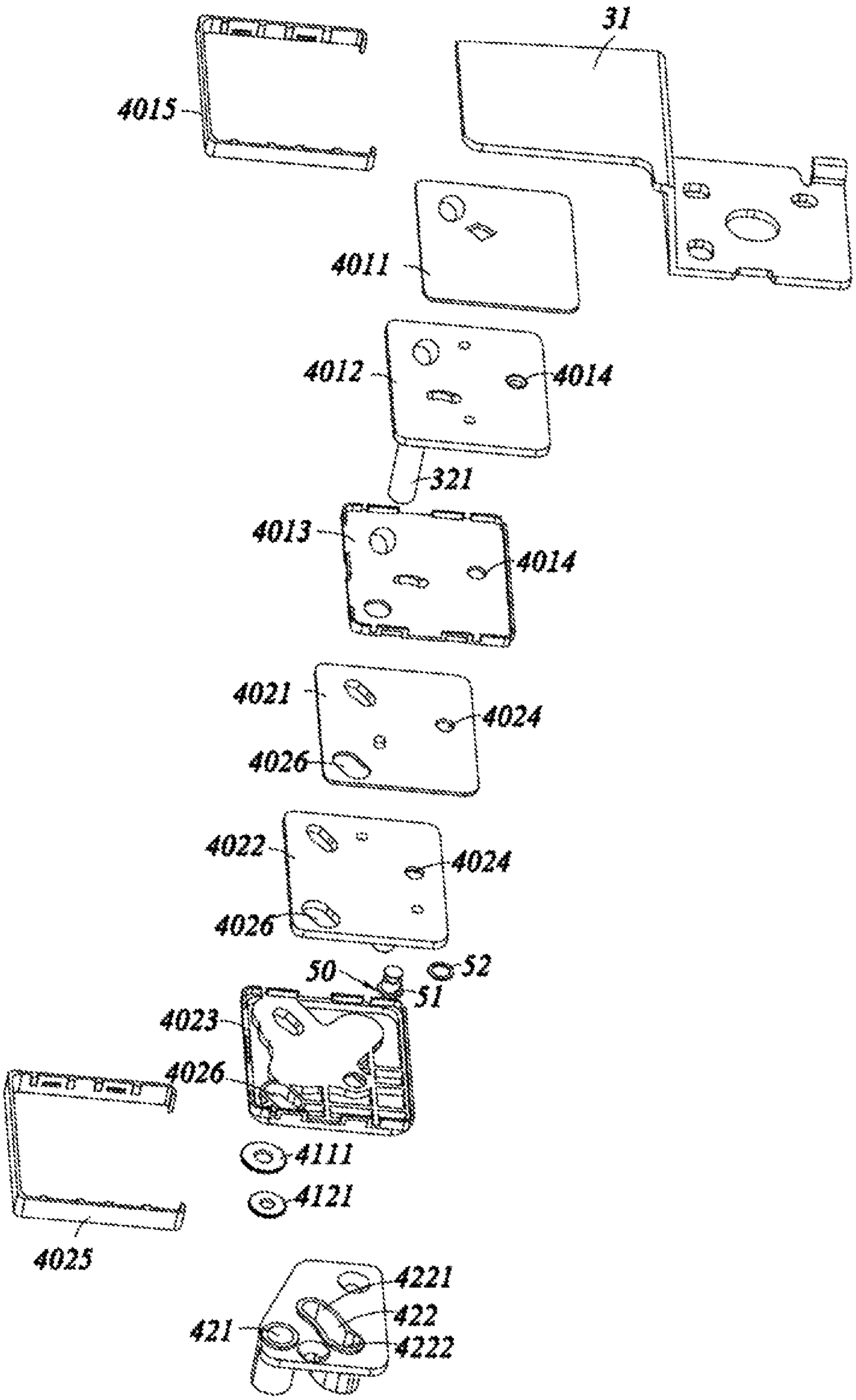
Figure 14:
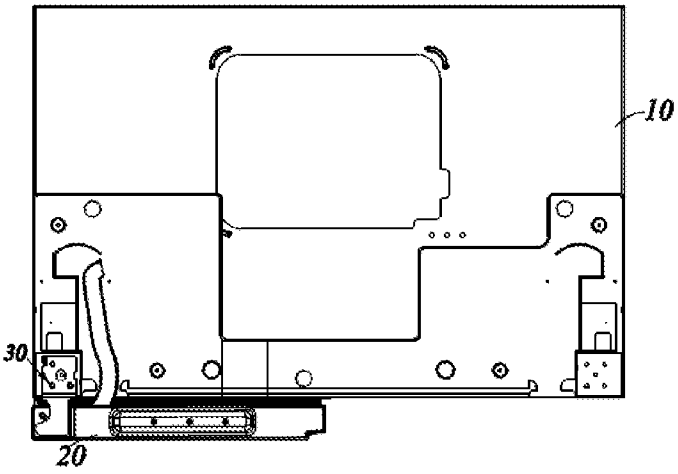
FIG. 14 is a top view of a refrigerator according to an embodiment of the present invention in a closed state.
Figure 15:
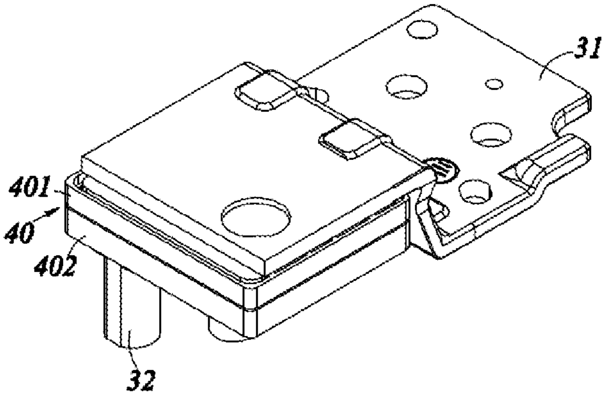
FIG. 15 is a perspective view of a hinge assembly in an embodiment of the present invention in a closed state.
Figure 16:
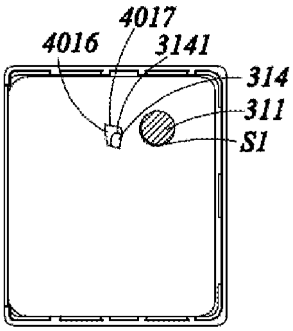
FIG. 16 is a top sectional view of a hinge assembly in an embodiment of the present invention in a closed state.
Figure 17:
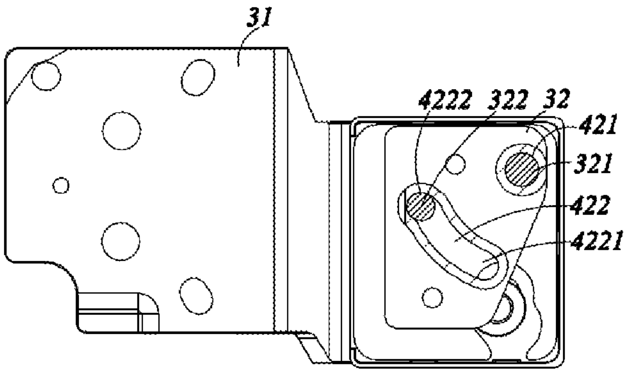
FIG. 17 is a bottom sectional view of a hinge assembly in an embodiment of the present invention in a closed state.
Figure 18:
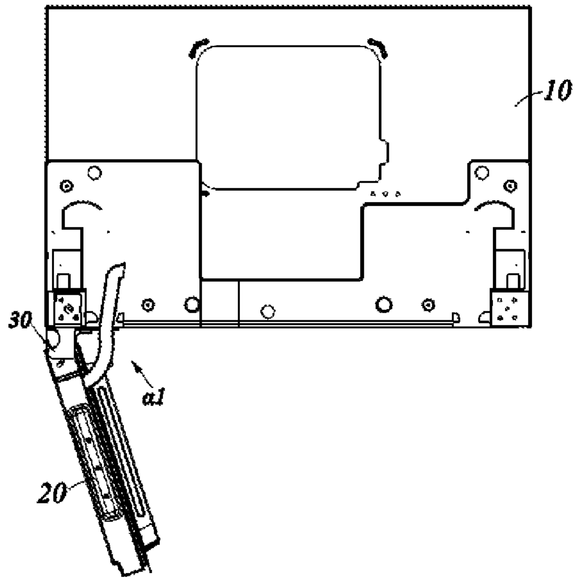
FIG. 18 is a top view of a refrigerator according to an embodiment of the present invention at a first opening angle.
Figure 19:
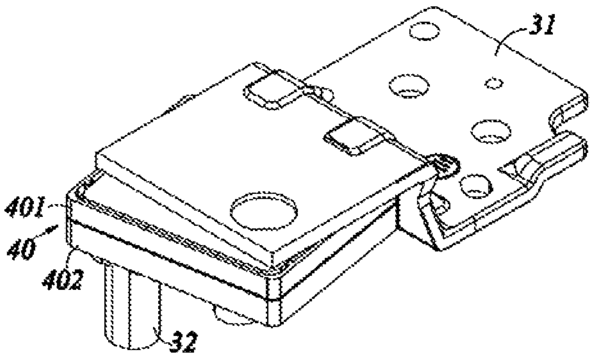
FIG. 19 is a perspective view of a hinge assembly in an embodiment of the present invention at a first opening angle.
Figure 20:
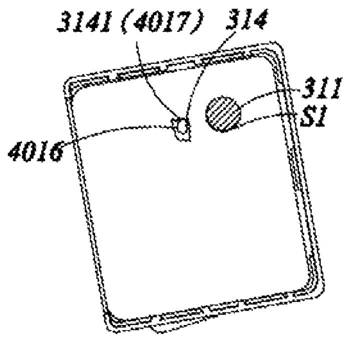
FIG. 20 is a top sectional view of a hinge assembly in an embodiment of the present invention at a first opening angle.
Figure 21:
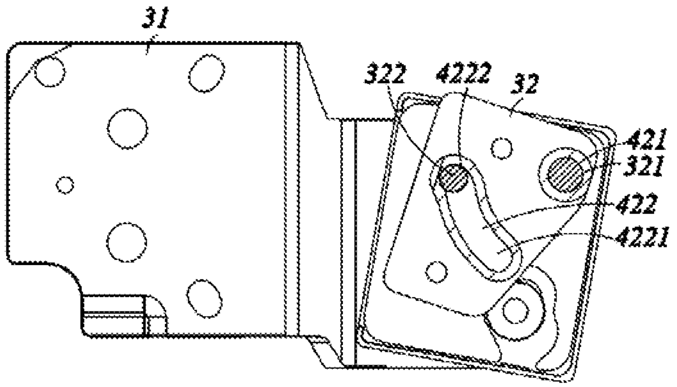
FIG. 21 is a bottom sectional view of a hinge assembly in an embodiment of the present invention at a first opening angle.
Figure 22:
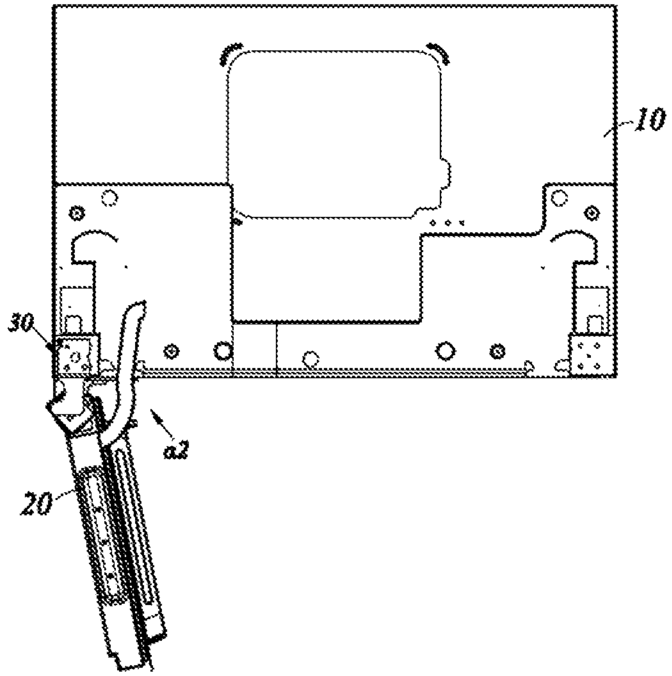
FIG. 22 is a top view of a refrigerator according to an embodiment of the present invention at a second opening angle.
Figure 23:
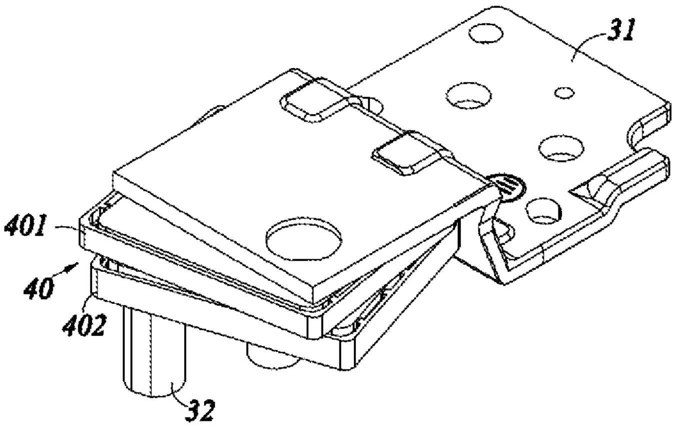
FIG. 23 is a perspective view of a hinge assembly in an embodiment of the present invention at a second opening angle.
Figure 24:
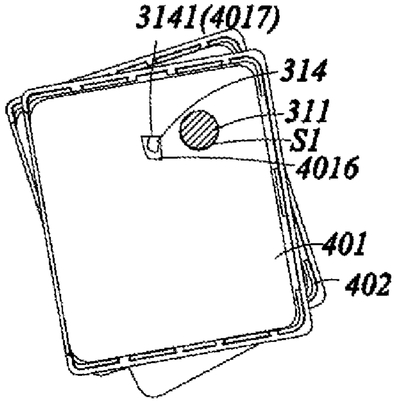
FIG. 24 is a top sectional view of a hinge assembly in an embodiment of the present invention at a second opening angle.
Figure 25:
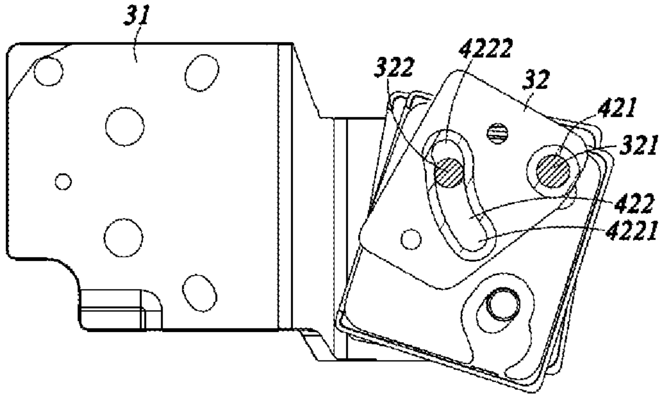
FIG. 25 is a bottom sectional view of a hinge assembly in an embodiment of the present invention at a second opening angle.
Figure 26:
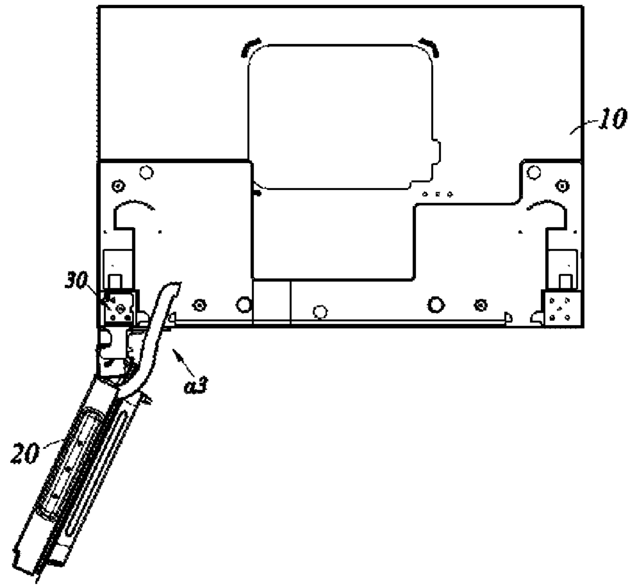
FIG. 26 is a top view of a refrigerator according to an embodiment of the present invention at a maximum opening angle.
Figure 27:
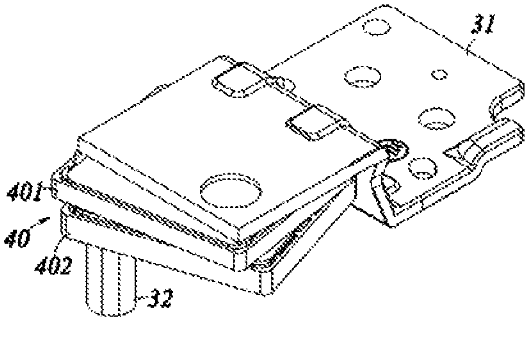
FIG. 27 is a perspective view of a hinge assembly in an embodiment of the present invention at a maximum opening angle.
Figure 28:
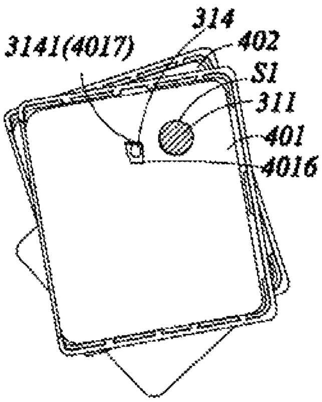
FIG. 28 is a top sectional view of a hinge assembly in an embodiment of the present invention at a maximum opening angle.
Figure 29:
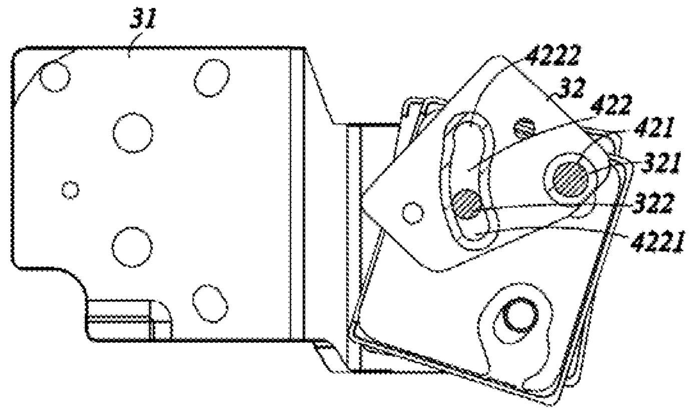
FIG. 29 is a bottom sectional view of a hinge assembly in an embodiment of the present invention at a maximum opening angle.

Referring to FIG. 13, the hinge assembly 30 further includes a first riveting sheet 4111 and a second riveting sheet 4121; when the first shaft 311 extends into the first groove 411, the first riveting sheet 4111 is located below the second switching part 402, and the first shaft 311 is sleeved with the first riveting sheet 4111, so as to prevent the first shaft 311 from being separated from the first groove 411.

The first switching part 401 and the second switching part 402 are fitted and connected with each other by a fifth shaft 50.

Here, the first switching part 401 and the second switching part 402 are provided with a first through hole 4014 and a second through hole 4024, and an independent riveting part as the fifth shaft 50 penetrates through the first through hole 4014 and the second through hole 4024.

Specifically, the fifth shaft 50 includes a riveting post 51 and a riveting post gasket 52, the riveting post 51 has a large end located below the second through hole 4024 and a small end sequentially extending into the second through hole 4024 and the first through hole 4014, and the riveting post gasket 52 is located above the first through hole 4014 and fitted with the riveting post 51 to lock the riveting post 51.

In this way, the first switching part 401 and the second switching part 402 may be fitted and connected with each other; that is, the first switching part 401 and the second switching part 402 may move relative to each other, and the first switching part 401 and the second switching part 402 may not be separated from each other.

It should be noted that the first through hole 4014 and the second through hole 4024 are matched with the fifth shaft 50, and the first switching part 401 rotates in situ relative to the second switching part 402.

In other embodiments, the through hole may be provided in one of the first switching part 401 and the second switching part 402, and the fifth shaft 50 may be provided at the other of the first switching part 401 and the second switching part 402, such that the first switching part 401 and the second switching part 402 are fitted and connected with each other by fitting the fifth shaft 50 with the through hole, but the present invention is not limited thereto.

In addition, the first switching part 401 includes the third shaft 321, the second switching part 402 has a through hole 4026, the third shaft 321 extends to the third groove 421 through the through hole 4026, the second switching part 402 includes the fourth shaft 322, and the fourth shaft 322 extends to the fourth groove 422.

Here, the through hole 4026 may have a greater size than the third shaft 321, such that the third shaft 321 may move in the through hole 4026, and when the first switching part 401 and the second switching part 402 move relatively, the through hole 4026 and the third shaft 321 may be prevented from interfering with each other.

That is, in the present embodiment, the third shaft 321 and the fourth shaft 322 are located at different switching parts, but the invention is not limited thereto.

In the present embodiment, referring to FIG. 13, the first switching part 401 includes a first lining 4011, a first sliding sheet 4012, and a first bushing 4013 which are stacked in sequence, and the second switching part 402 includes a second lining 4021, a second sliding sheet 4022, and a second bushing 4023 which are stacked in sequence.

Here, the first hinge part 31, the first lining 4011, the first sliding sheet 4012, the first bushing 4013, the second lining 4021, the second sliding sheet 4022, the second bushing 4023, and the second hinge part 32 are stacked in sequence from top to bottom.

The first lining 4011, the first bushing 4013, the second lining 4021 and the second bushing 4023 are made of plastic, such as polyformaldehyde (POM), or the like.

The first sliding sheet 4012 and the second sliding sheet 4022 are made of metal, such as stainless steel, Q235 steel, or the like.

The first lining 4011, the first sliding sheet 4012 and the first bushing 4013 have matched profiles, and the first lining 4011 and the first bushing 4013 are fitted with each other to sandwich the first sliding sheet 4012 therebetween; the first lining 4011, the first sliding sheet 4012 and the first bushing 4013 are all required to be provided with slots to form the first upper groove 413, the second upper groove 415 and the first through hole 4014 in cooperation.

Here, the slots may be formed only in the first sliding sheet 4012 and the first bushing 4013 to form the first through hole 4014; that is, the first through hole 4014 does not penetrate through the first lining 4011, and at this point, the fifth shaft 50 extends from a position below the first switching part 401 into the first through hole 4011, and the first lining 4011 may shield the first through hole 4014 and the fifth shaft 50, thereby improving attractiveness.

The second lining 4021, the second sliding sheet 4022 and the second bushing 4023 have matched profiles, and the second lining 4021 and the second bushing 4023 are fitted with each other to sandwich the second sliding sheet 4022 therebetween; the second lining 4021, the second sliding sheet 4022 and the second bushing 4023 are all required to be provided with slots to form the first lower groove 414, the second lower groove 416 and the second through hole 4024 in cooperation.

Here, the slots may be formed only in the second lining 4021 and the second sliding sheet 4022 to form the second through hole 4024; that is, the second through hole 4024 does not penetrate through the second bushing 4023, and at this point, the fifth shaft 50 extends from a position below the second bushing 4023 into the second through hole 4024 and the first through hole 4011, and the second bushing 4023 may shield the second through hole 4024 and the fifth shaft 50, thereby improving the attractiveness.

At this point, one end of the riveting post 51 of the fifth shaft 50 may be limited in the second bushing 4023, so as to further improve a fitting effect of the second lining 4021, the second sliding sheet 4022 and the second bushing 4023.

In the present embodiment, the first switching part 401 further includes a first decorative sheet 4015 covering peripheries of the first lining 4011, the first sliding sheet 4012, and the first bushing 4013, the second switching part 402 further includes a second decorative sheet 4025 covering peripheries of the second lining 4021, the second sliding sheet 4022, and the second bushing 4023, and the first decorative sheet 4015 and the second decorative sheet 4025 are separated from each other.

Here, "the first decorative sheet 4015 and the second decorative sheet 4025 are separated from each other" means that the first decorative sheet 4015 and the second decorative sheet 4025 have independent structures, and when the first switching part 401 and the second switching part 402 move relatively, the first decorative sheet 4015 and the second decorative sheet 4025 also move relatively.

In addition, in the present embodiment, the first decorative sheet 4015 is in an n shape; that is, the first decorative sheet 4015 covers only three side surfaces of the first switching part 401, so as to assemble the first decorative sheet 4015; the three side surfaces may be provided with snap structures to be fitted with the first decorative sheet 4015, and in a stacking direction of the first switching part 401 and the second switching part 402, a width of the first decorative sheet 4015 is substantially equal to a sum of thicknesses of the first lining 4011, the first sliding sheet 4012, and the first bushing 4013.

Similarly, the second decorative sheet 4025 is in an n shape; that is, the second decorative sheet 4025 covers only three side surfaces of the second switching part 402, so as to assemble the second decorative sheet 4025; the three side surfaces may be provided with snap structures to be fitted with the second decorative sheet 4025, and in the stacking direction of the first switching part 401 and the second switching part 402, a width of the second decorative sheet 4025 is substantially equal to a sum of thicknesses of the second lining 4021, the second sliding sheet 4022, and the second bushing 4023.

The first decorative sheet 4015 and the second decorative sheet 4025 may be made of Acrylonitrile Butadiene Styrene (ABS) plastic.

Next, a specific operation flow of the hinge assembly 30 will be described.

In the present embodiment, the cabinet 10 includes an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22.

Referring to FIGS. 14 to 17, when the door 20 is in the closed state, the first switching part 401 and the second switching part 402 are relatively stationary, the first shaft 311 is located at the first free section 51, and the fourth shaft 322 is located at the limiting section 4222, such that the switching assembly 40 limits the second hinge part 32.

Specifically, the outer side surface 13 and the side wall 22 are located on a same plane, which may guarantee appearance smoothness, improve attractiveness, and facilitate a mounting process of the door 20, but the present invention is not limited thereto.

Here, it should be noted that when the door 20 is in the closed state, the third shaft 321 is located at the third free section 421, the fourth shaft 322 is limited in the limiting section 4222, a distance between the third shaft 321 and the fourth shaft 322 remains unchanged, the third shaft 321 is located at the first switching part 401, the fourth shaft 322 is located at the second switching part 402, and the first switching part 401 and the second switching part 402 are relatively stationary under the common limit of the third shaft 321 and the fourth shaft 322.

Referring to FIGS. 18 to 21, when the door 20 is opened from the closed state to the first opening angle α1, the first switching part 401 and the second switching part 402 are relatively stationary, the first free section 51 is formed by overlapped parts of the first upper groove 413 and the first lower groove 414, the first shaft 311 moves in situ in the first free section 51, and the recess 4016 abuts against the bump 314, such that the switching assembly 40 limits the first hinge part 31, and the door 20 rotates in situ relative to the cabinet 10.

Here, when the door 20 is in the closed state, the bump 314 is located in the recess 4016, and the first limiting surface 3141 is apart from the second limiting surface 4017; when the door 20 is opened from the closed state to the first opening angle α1, the first hinge part 31 is fixed to the cabinet 10, the door 20 drives the switching assembly 40 to move together relative to the first hinge part 31, the bump 314 moves in the recess 4016, and the first limiting surface 3141 and the second limiting surface 4017 gradually approach until the first limiting surface 3141 abuts against the second limiting surface 4017; at this point, the first switching part 401 is unable to rotate relative to the first hinge part 31; that is, the switching assembly 40 locks the first hinge part 31, and a rotation angle of the door 20 when the first limiting surface 3141 abuts against the second limiting surface 4017 may be controlled by controlling sizes, shapes, or the like, of the bump 314 and the recess 4016.

In the present embodiment, the door 20 rotates in situ relative to the cabinet 10 when opened to the first opening angle α1, thus ensuring that the door 20 is not displaced in this process.

It should be noted that when the door 20 is opened from the closed state to the first opening angle α1, the fourth shaft 322 is always limited at the limiting section 4222, such that the switching assembly 40 limits the second hinge part 32.

With reference to FIGS. 22 to 25, when the door 20 is continuously opened from the first opening angle α1 to the second opening angle α2, the first switching part 401 and the second switching part 402 move relatively, such that the fourth shaft 322 is separated from the limiting section 4222.

Specifically, when the first switching part 401 and the second switching part 402 move relatively, the distance between the third shaft 321 located at the first switching part 401 and the fourth shaft 322 located at the second switching part 402 changes, the third shaft 321 is always located in the third free section 421, and the fourth shaft 322 moves from the limiting section 4222 to the fourth free section 4221; that is, the fourth shaft 322 is separated from the limiting section 4222.

It should be noted that a locking operation of the first hinge part 31 is not limited to the above-mentioned cooperation of the bump 314 and the recess 4016, and in other embodiments, the first hinge part 31 may be locked by other structures, for example, by locking the first shaft 311; specifically, a locking section may be provided at the first groove 411, and the first shaft 311 may be locked when the first shaft 311 rotates to the locking section; or, the first switching part 401 and the second switching part 402 move relatively to form a locking section between the first upper groove 413 and the first lower groove 414, and the locking section may be configured to lock the first shaft 311.

Referring to FIGS. 26 to 29, when the door 20 is continuously opened from the second opening angle α2 to the maximum opening angle α3, the first switching part 401 and the second switching part 402 are relatively stationary, the third shaft 321 rotates in situ at the third free section 421, the fourth shaft 322 moves in the fourth free section 422 around the third shaft 321, and the door 20 continuously rotates in situ relative to the cabinet 10.

It may be seen that in the present embodiment, by the unlocking and locking effects of the switching assembly 40 on the first hinge part 31 and the second hinge part 32, the first hinge part 31 and the second hinge part 32 may be effectively controlled to be switched sequentially, such that the door 20 may be opened stably.

Figure 30:
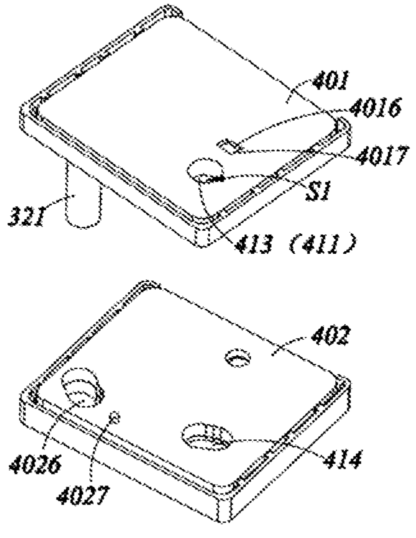
FIGS. 30 and 31 are exploded views of a switching assembly in an embodiment of the present invention from different perspectives.
Figure 31:
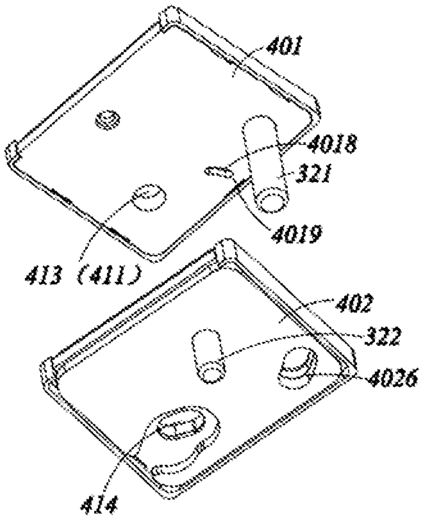

In the present embodiment, referring to FIGS. 30 and 31, the first switching part 401 includes a first stopper 4018, the second switching part 402 includes a second stopper 4027 fitted with the first stopper 4018, and when the door 20 is closed from the second opening angle α2 to the first opening angle α1, the second switching part 402 limits movement of the first switching part 401 by fitting the second stopper 4027 with the first stopper 4018.

Specifically, the first stopper 4018 is configured as a groove portion 4018 located on the first switching part 401, the second stopper 4027 is configured as a protruding portion 4027 located on the second switching part 402, and one end of the groove portion 4018 is configured as a stopping end 4019; when the door 20 is opened from the closed state to the first opening angle α1, the first switching part 401 and the second switching part 402 are relatively stationary, the protruding portion 4027 is retained on a side of the groove portion 4018 apart from the stopping end 4019; when the door 20 is opened from the first opening angle α1 to the second opening angle α2, the first switching part 401 and the second switching part 402 move relatively, the protruding portion 402 moves towards a side close to the stopping end 4019 in the groove portion 4018 until the protruding portion 402 abuts against the stopping end 4019, and the first switching part 401 and the second switching part 402 are relatively stationary.

It may be understood that, in the opening process of the door 20, the relative movement between the first switching part 401 and the second switching part 402 may be controlled by other structures; for example, the first switching part 401 and the second switching part 402 stop the relative movement by abutting the grooves on the first switching part 401 and the second switching part 402 against the first shaft 311 and the third shaft 321; at this point, the first switching part 401 and the second switching part 402 are kept relatively stationary and mutually staggered; preferably, when the first switching part 401 and the second switching part 402 stop the relative movement, the protruding portion 402 just abuts against the stopping end 4019, but the present invention is not limited thereto.

An interaction between the protruding portion 402 and the groove portion 4018 mainly plays a role in the closing process of the door 20; in actual operation, when the door 20 is closed from the second opening angle α2 to the first opening angle α1, since the protruding portion 402 abuts against the stopping end 4019, the first switching part 401 is unable to rotate without rotating the second switching part 402; that is, in this process, rotation of the first switching part 401 is certainly later than rotation of the second switching part 402, and after overlapped, the first switching part 401 and the second switching part 402 are relatively stationary, and then, the first switching part 401 and the second switching part 402 move together relative to the first shaft 311 until the door 20 is closed.

It may be understood that the closing process of the door 20 and the opening process of the door 20 are processes in reverse orders, and the switching sequence of the first hinge part 31 and the second hinge part 32 in the opening and closing processes of the door 20 may be effectively controlled by the unlocking and locking effects of the switching assembly 40 on the first hinge part 31 and the second hinge part 32.

In addition, in the present embodiment, the first shaft 311 and the third shaft 321 are staggered, and thus, the refrigerator may be suitable for an embedded cupboard or a scenario with a small space for accommodating the refrigerator 100.

Figure 32:
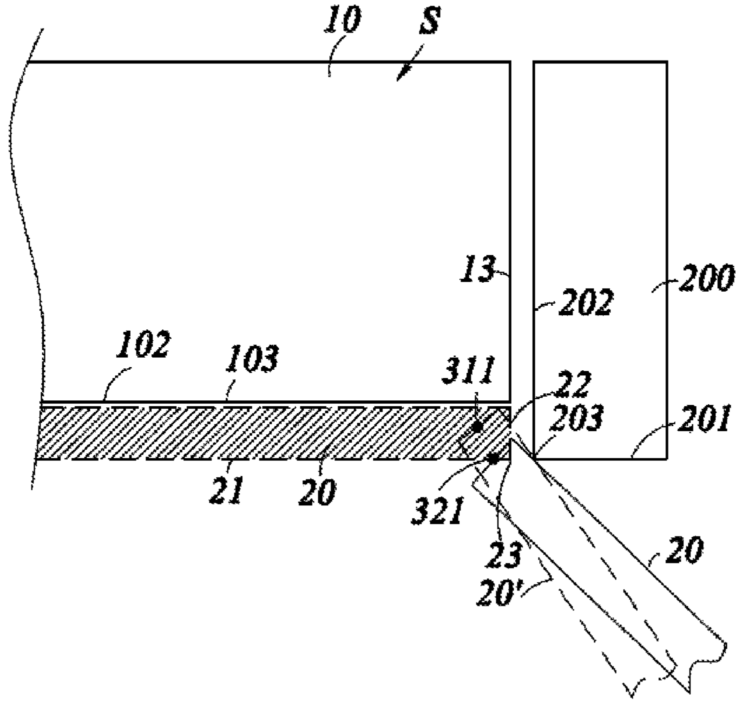
FIG. 32 is a schematic diagram of a refrigerator according to an embodiment of the present invention in a fully embedded state.

Referring to FIG. 32, a simple schematic diagram in which the refrigerator 100 is embedded in a cupboard 200 is taken as an example for illustration.

In the present embodiment, the cabinet 10 includes an opening 102 and a front end surface 103 provided around the opening 102; the cabinet 10 further includes an accommodating chamber S and an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22.

Here, when the door 20 is opened to the first opening angle α1 from the closed state, the door 20 rotates around the first shaft 311, and a first distance exists between the first shaft 311 and the front end surface 103; when the door 20 is continuously opened from the second opening angle α2 to the maximum opening angle α3, the door 20 rotates around the third shaft 321, a second distance exists between the third shaft 321 and the front end surface 103, and the second distance is greater than the first distance, thus greatly increasing the maximum opening angle of the fully-embedded refrigerator 100.

In addition, a third distance exists between the first shaft 311 and the outer side surface 13, and when the door 20 is continuously opened from the second opening angle α2 to the maximum opening angle α3, a fourth distance exists between the third shaft 321 and the outer side surface 13, and the fourth distance is less than the third distance, thus further increasing the opening degree of the cabinet 10.

Details are as follows.

In some motion tracks of the refrigerator 100, the door 20 may be considered to move relative to the cabinet 10 around the first shaft 311 and the third shaft 321.

In the present embodiment, the door 20 is simply considered to rotate around the first shaft 311 first, and be then switched to rotate around the third shaft 321 by the switching assembly 40.

In practice, in order to improve an embedding effect, the refrigerator 100 is preferably embedded into the cupboard 200 completely, and the refrigerator 100 is configured as a free-embedded refrigerator; that is, a front end 201 of the cupboard 200 is located on a same plane as the front wall 21 on a side of the door 20 apart from the cabinet 10, or the front wall 21 of the door 20 does not protrude from the front end 201 of the cupboard 200 at all.

In a prior art, all refrigerators are single-shaft refrigerators, and certain distances are required to be kept between a rotating shaft of the refrigerator and a side wall and a front wall of the refrigerator, such that enough spaces may be provided to satisfy foaming or other processes; that is, the rotating shaft of the existing refrigerator is approximately located at the position of the first shaft 311 in FIG. 32; in this case, after the single-shaft refrigerator is embedded into the cupboard 200, since a corner 203 of the cupboard 200 between the front end 201 and an inner wall 202 is provided corresponding to the side edge 23 of the door 20, when the door 20 is opened, the side edge 23 interferes with the door 20 to limit the maximum opening angle of the door 20; in order to ensure that the door 20 is opened normally, a common method in the prior art is to increase a gap between the inner wall 202 of the cupboard 200 and the refrigerator 100, and this gap is required to have a size of approximate 10 cm, which seriously affects the embedding effect and is not favorable for rational utilization of a limited space.

Referring to FIG. 32, a shaded region represents the door 20 in the closed state; when the door 20 is in the opening process, and when the door 20 always rotates around the first shaft 311 (i.e., the prior art), referring to the dotted-line door 20' in FIG. 32, since the first shaft 311 is close to the front end surface 103 (that is, apart from the front end 201 of the cupboard 200), after the door 20' is opened to a certain angle, the corner 203 of the cupboard 200 interferes with the door 20' to limit the maximum opening angle of the door 20'.

In the present embodiment, the third shaft 321 is located at the first switching part 401, and in the opening process of the door 20, the switching assembly 40 moves relative to the first hinge part 31 and the second hinge part 32, such that the third shaft 321 gradually moves away from the front end surface 103; that is, the third shaft 321 gradually moves towards the front end 201 of the cupboard 200; that is, at this point, the whole door 20 moves away from the cabinet 10; referring to the solid-line door 20 in FIG. 32, the interference effect of the corner 203 of the cupboard 200 on the door 20 is reduced greatly, and the corner 203 of the cupboard 200 interferes with the door when the door 20 is opened to a larger angle, thereby greatly increasing the maximum opening angle of the door 20.

That is, in the present embodiment, the door 20 may rotate around the third shaft 321 in a later period under the action of the switching assembly 40, such that the maximum opening angle of the door 20 may be effectively increased on the premise of ensuring that the refrigerator 100 is freely embedded into the cupboard 200, thus facilitating a user to operate the refrigerator 100, and greatly improving user experiences.

Moreover, in the present embodiment, the gap between the inner wall 202 of the cupboard 200 and the refrigerator 100 is not required to be increased, and the refrigerator 100 and the cupboard 200 may be connected seamlessly, thereby greatly improving the embedding effect.

In addition, in the present embodiment, the switching assembly 40 drives the third shaft 321 to gradually move towards the front end 201 of the cupboard 200, and simultaneously drives the third shaft 321 to gradually approach the inner wall 202 of the cupboard 200; that is, when the door 20 rotates around the third shaft 321, the third shaft 321 is closer to the front end 201 and the inner wall 202 of the cupboard 200 than the first shaft 311, so as to increase the maximum opening angle of the door 20, and make the door 20 apart from the cabinet 10 to increase the opening degree of the cabinet 10, thereby facilitating opening and closing operations of racks, drawers, or the like, in the cabinet 10, or facilitating taking and placing operations of articles.

Certainly, the third shaft 321 finally used as the rotating shaft may be located at other positions; for example, when the door 20 rotates around the third shaft 321, the third shaft 321 is closer to the front end 201 of the cupboard 200 than the first shaft 311, and the third shaft 321 is farther away from the inner wall 202 of the cupboard 200 than the first shaft 311, or the like.

It may be understood that the switching assembly 40 controls the switching sequence of the first hinge part 31 and the second hinge part 32 in the opening and closing processes of the door 20, thus effectively preventing the door 20 from interfering with the cupboard 200 in the opening and closing processes.

Figure 33:
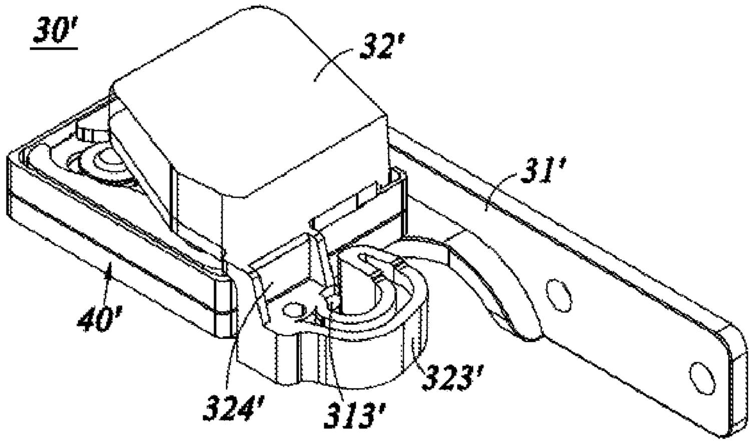
FIG. 33 is a perspective view of a hinge assembly below a door in an embodiment of the present invention.
Figure 34:
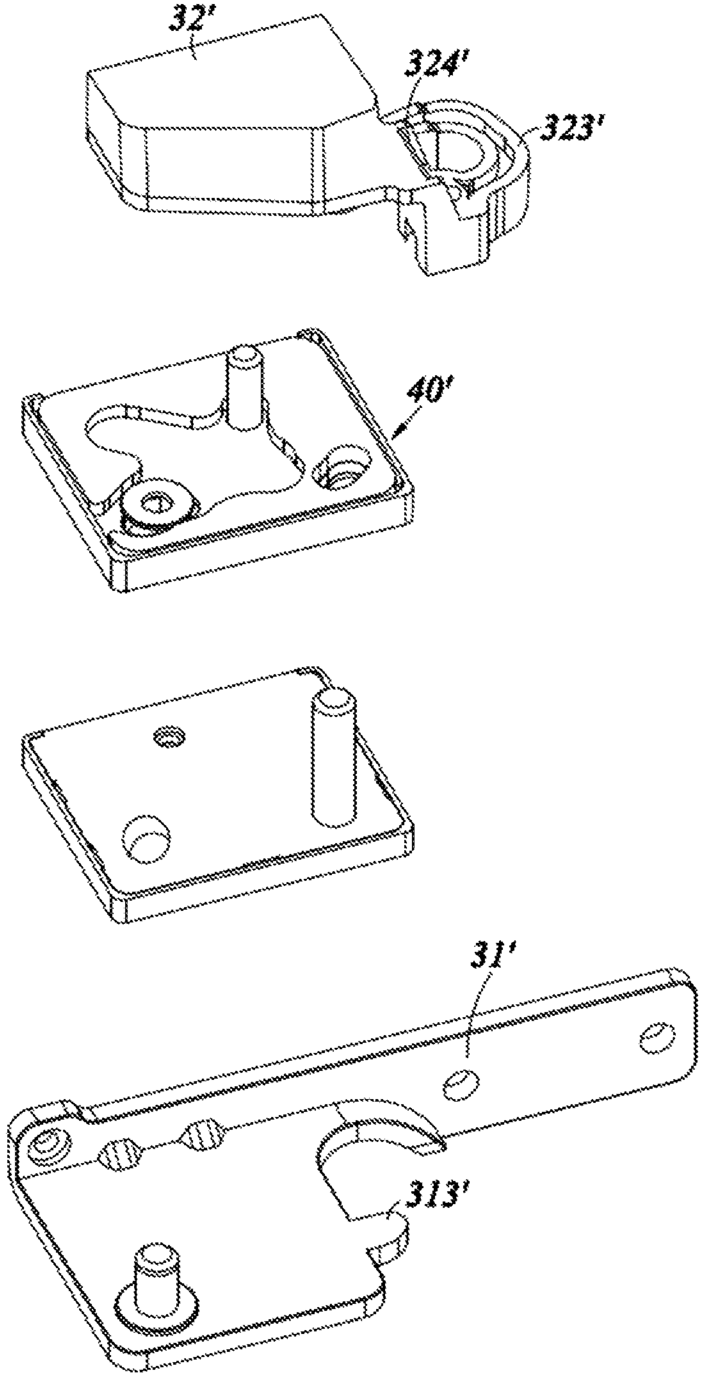
FIG. 34 is an exploded view of a hinge assembly below a door in an embodiment of the present invention.
Figure 35:
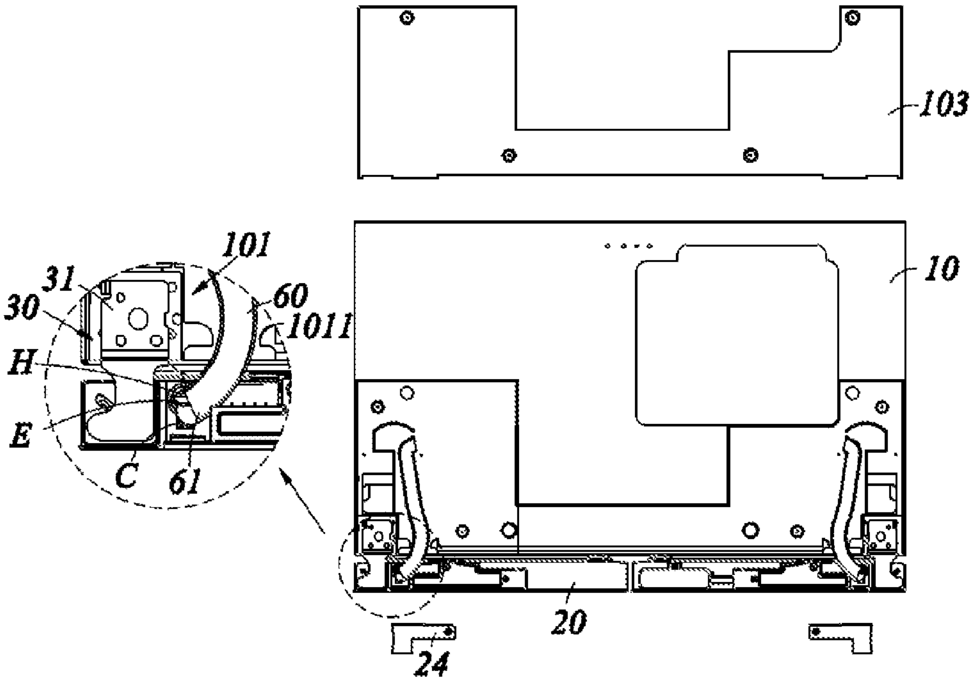
FIG. 35 is a top view of the refrigerator with a wiring module in an embodiment of the present invention.
Figure 36:
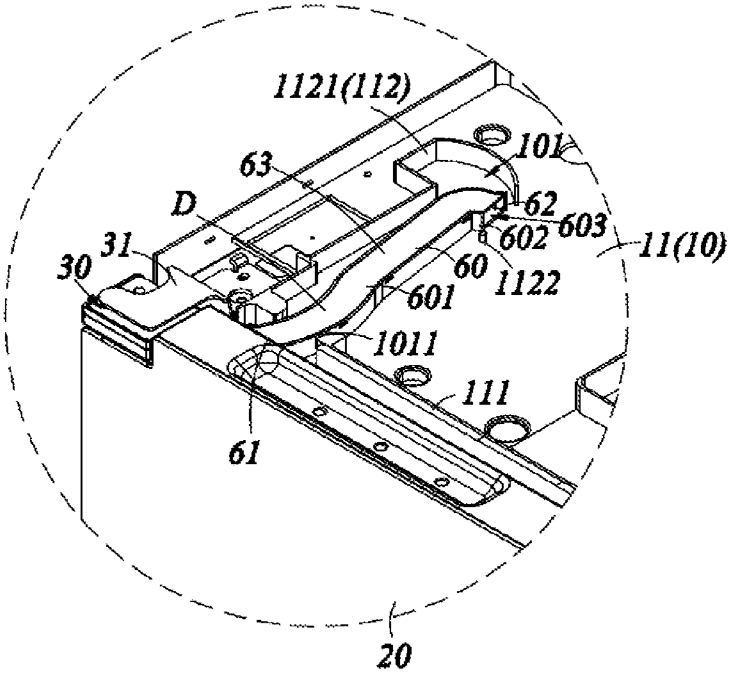
FIG. 36 is a partially enlarged perspective view of the refrigerator with the wiring module in an embodiment of the present invention.
Figure 37:
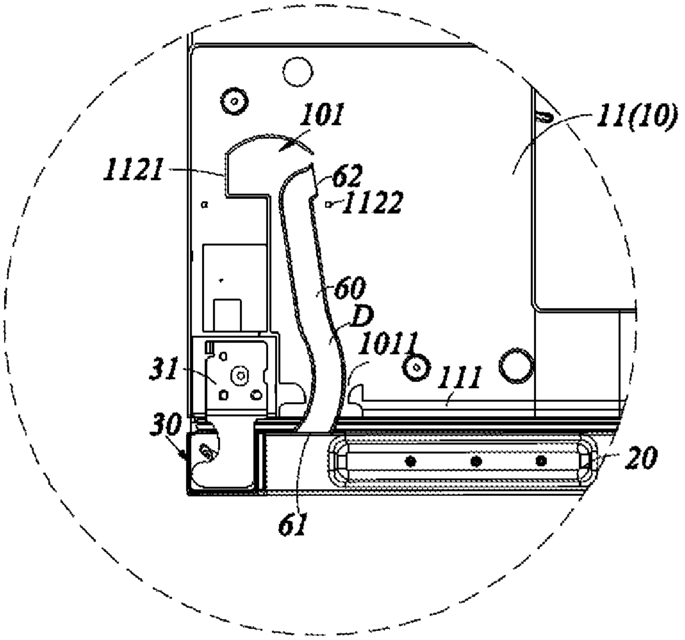
FIG. 37 is a partially enlarged top view (corresponding to the closed state of the door) of the refrigerator with the wiring module in an embodiment of the present invention.
Figure 38:
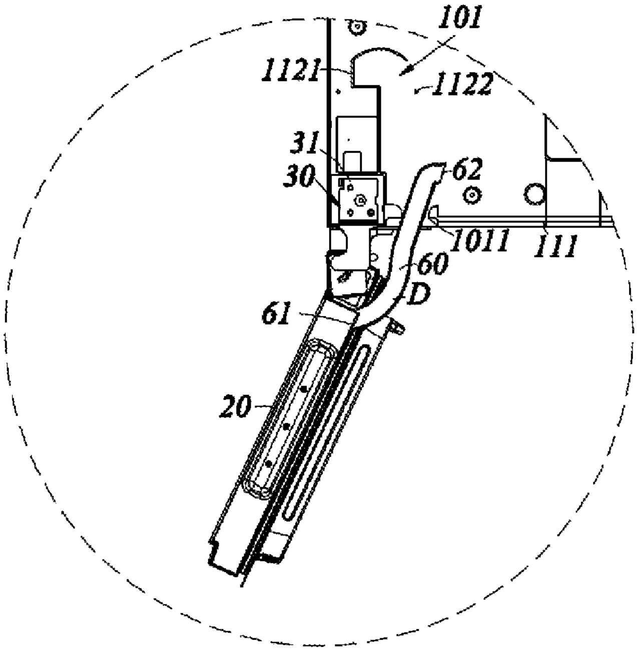
FIG. 38 is a partially enlarged top view (corresponding to an open state of the door) of the refrigerator with the wiring module in an embodiment of the present invention.

In the present embodiment, the hinge assembly 30 is structurally different in different regions of the door 20, the above-mentioned hinge assembly 30 is located between an upper portion of the door 20 and the cabinet 10, and hereinafter, the hinge assembly 30' located between a lower portion of the door 20 and the cabinet 10 will be briefly described with reference to FIGS. 33 and 34.

The lower hinge assembly 30' is different from the upper hinge assembly 30 in that: the first hinge part 31' of the lower hinge assembly 30' has a projection 313', the second hinge part 32' has a corresponding hook 323', and the hook 323' is configured as an elastic part; when the door 20 is in the closed state, the projection 313' acts on the hook 323' to deform, such that the door 20 is in close fit with the cabinet 10, and when the door 20 is in the opening process, the door 20 drives the hook 323' to move, and the hook 323' deforms to be separated from the projection 313'.

That is, when the door 20 is in the closed state, the projection 313' is in interference fit with the hook 323', thus enhancing a closing effect of the door 20.

It should be noted that, since the switching assembly 40' is connected between the first hinge part 31' and the second hinge part 32', the second hinge part 32' further includes an extension section 324' passing through the switching assembly 40' in a thickness direction, and the extension section 324' is connected to the hook 323', such that the hook 323' may be provided horizontally and fitted with the projection 313'.

In the present embodiment, with reference to FIGS. 35 to 38, the refrigerator 100 is configured as a refrigerator 100 with a wiring module 60.

The wiring module 60 includes a fixed end 61 and a free end 62 which are provided oppositely, the fixed end 61 is connected to the door 20, the free end 62 is movably provided at the cabinet 10, and wiring E of the cabinet 10 sequentially passes through the free end 62 and the fixed end 61 and extends to the door 20.

Here, "the free end 62 is movably provided at the cabinet 10" means that the free end 62 is not fixed to the cabinet 10, and as the door 20 is opened, the free end 62 may move relative to the cabinet 10, such that the wiring E in the wiring module 60 may also move freely as the door 20 is opened.

It should be noted that, with intellectualization and multi-functionalization of the refrigerator 100, some functional modules, such as an ice making module, a display module, or the like, are usually provided on the door 20 of the refrigerator 100, and these modules are usually required to be connected with a control module in the cabinet 10 through the wiring E; the wiring E in the present embodiment extends to the door 20 by means of the wiring module 60, which may effectively avoid a phenomenon that the wiring E is pulled in the opening and closing processes of the door 20, and may adapt to the door 20 with various motion tracks; for example, when the hinge assembly 30 drives the door 20 to move from the pivoting side P towards the accommodating chamber S, an extension track of the wiring E also changes, and the present embodiment may completely adapt to the movement of the door 20 using the design of the wiring module 60; that is, the extension track of the wiring E may be flexibly adjusted by the wiring module 60, so as to avoid a wiring jamming problem.

In the present embodiment, the refrigerator 100 further includes a limiting space 101, the limiting space 101 includes a notch 1011 provided towards the door 20, the fixed end 61 of the wiring module 60 passes through the notch 1011 to be connected to the door 20, and when the door 20 is in the opening process, the door 20 drives the wiring module 60 to move in the limiting space 101, and the free end 62 is always located in the limiting space 101.

Here, the limiting space 101 is located at a top 11 of the cabinet 10, the wiring module 60 is provided parallel to the top 11 of the cabinet 10, and the fixed end 61 is movably connected to the door 20; certainly, the limiting space 101 may be provided in other regions.

Specifically, in the present embodiment, the wiring module 60 includes a first housing 601 and a second housing 602, the second housing 602 is provided near the top 11 of the cabinet 10, the first housing 601 is apart from the top 11 of the cabinet 10 relative to the second housing 602, the first housing 601 and the second housing 602 are fitted with each other to form an accommodating cavity 603 for accommodating the wiring E, and two end openings of the accommodating cavity 603 are configured as the fixed end 61 and the free end 62.

The door 20 protrudes upwards from the top 11 of the cabinet 10, an edge of the top 11 close to the door 20 is provided with a stopper 111 protruding from the top 11, the notch 1011 is formed in the stopper 111, the refrigerator 100 includes a plurality of protrusions 112 protruding from the top 11, and the plurality of protrusions 112 enclose the limiting space 101.

Here, the first hinge part 31 is fixed at the edge of the top 11, and in order to adapt to the design of the door 20 protruding from the top 11, the first hinge part 31 of the hinge assembly 30 has a substantial Z shape, such that the first hinge part 31 may extend from the top 11 of the cabinet 10 to a top of the door 20 to be fitted with the switching assembly 40 at the top of the door 20; the plurality of protrusions 112 include a first protrusion 1121 between the first hinge part 31 and the wiring module 60 and a second protrusion 1122 spaced apart from the first protrusion 1121, the first protrusion 1121 may prevent the wiring module 60 from interfering with the first hinge part 31, a profile of the first protrusion 1121 adapts to the motion track of the wiring module 60, and the second protrusions 1122 may be configured as a plurality of convex posts to reduce an impact between the wiring module 60 and the second protrusions 1122.

The refrigerator 100 may further include a cover 103, the cover 103 is located at the top 11 and covers the limiting space 101, the first hinge part 31, or the like, the cover 103 may be fitted with the stopper 111, and a shape of the cover 103 may be determined according to specific requirements.

In addition, the fixed end 61 and the notch 1011 of the wiring module 60 are both provided close to the hinge assembly 30, and it may be understood that in the opening process of the door 20, the wiring module 60 may be exposed in an opening gap of the door 20; the fixed end 61 and the notch 1011 are provided close to the hinge assembly 30, such that on the one hand, the motion track of the wiring module 60 may be controlled reasonably, and on the other hand, the wiring module 60 may be prevented from affecting an appearance and normal use of the refrigerator 100.

The wiring module 60 is provided horizontally and extends to the door 20 through the notch 1011; the door 20 is provided with a wiring hole H, the wiring E extends from the fixed end 61 into the door 20 through the wiring hole H, a region C adjacent to the wiring hole H is pivotally connected to a region of the fixed end 61, and the door 20 includes a lid 24 covering the fixed end 61, the wiring hole H and the region C, such that the wiring module 60 may be movably connected with the door 20; when the door 20 is in the opening process, the door 20 drives the wiring module 60 to move, and the wiring module 60 may move freely according to different tracks in the limiting space 101; that is, the motion track of the wiring module 60 may be completely adapted to the motion track of the door 20, thereby avoiding the wire jamming problem.

In addition, the wiring module 60 includes an arc section D, such that the wiring E may be further prevented from being disturbed in the accommodating cavity 603.

It should be noted that, in order to avoid abrasion and sliding noise of the wiring module 60, a buffer component, a sliding component, or the like, may be provided between the second housing 602 of the wiring module 60 and the top 11 of the cabinet 10, and the specific component may be determined according to actual situations.

In the present embodiment, the notch 1011 of the limiting space 101 has a first notch width, the wiring module 60 includes a movable portion 63 located between the fixed end 61 and the free end 62, and the first notch width is greater than a maximum width of the movable portion 63.

That is, as the door 20 is opened, the movable portion 63 gradually protrudes from the limiting space 101; the first notch width is greater than the maximum width of the movable portion 63, so as to prevent the notch 1011 from limiting the protrusion of the movable portion 63 from the limiting space 101; the notch 1011 may control the motion track of the wiring module 60 to a certain extent, thereby avoiding that the wiring module 60 is separated from the limiting space 101 due to an excessively large motion amplitude.

Here, in order to further prevent the wiring module 60 from being separated from the limiting space 101, the free end 62 may be bent; that is, an included angle is formed between the free end 62 and the movable portion 63.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A free embedded refrigerator, comprising: a cabinet, a door for opening and closing the cabinet, and a hinge assembly for connecting the cabinet and the door, wherein the hinge assembly comprises a first hinge part, a second hinge part and a switching assembly disposed between the first hinge part and the second hinged part, and engaged respectively with the first hinge part and the second hinge part; when the door is in an opening process, the switching assembly moves relative to the first hinge part to drive the door to rotate in situ relative to the cabinet, and then, the switching assembly drives the second hinge part to move relative to the switching assembly to drive the door to continuously rotate in situ;

wherein the first hinge part is fixed to the cabinet, the second hinge part is fixed to the door, the first hinge part comprises a first limiting portion, the second hinge part comprises a limiting section, and the switching assembly comprises a first fitting part, a second fitting part and a second limiting portion; when the door is opened from a closed state to a first opening angle, the first hinge part and the first fitting part move relatively to drive the door to rotate in situ relative to the cabinet, and the second fitting part is limited by the limiting section of the second hinge part from relative movement to the second hinge part; when the door is continuously opened from the first opening angle to a second opening angle, the second fitting part is released from limitation of the limiting section of the second hinge part, and the first fitting part is limited by engagement between the first limiting portion and the second limiting portion from relative movement to the first hinge part; when the door is continuously opened from the second opening angle to a maximum opening angle, the second hinge part and the second fitting part move relatively to drive the door to continuously rotate in situ, wherein the first hinge part and the first fitting part move relatively by a first shaft and a first groove which are fitted with each other, and the second hinge part and the second fitting part move relatively by a second shaft set and a second groove set which are fitted with each other; the second shaft set comprises a third shaft and a fourth shaft, and the second groove set comprises a third groove fitted with the third shaft and a fourth groove fitted with the fourth shaft; and wherein one of the first limiting portion and the second limiting portion is configured as a bump, the other is configured as a recess, the bump comprises a first limiting surface, and the recess comprises a second limiting surface; when the door is in the closed state, the first limiting surface is apart from the second limiting surface, and when the door is opened from the closed state to the first opening angle, the first limiting surface and the second limiting surface gradually approach until the first limiting surface abuts against the second limiting surface.

2. The free embedded refrigerator according to claim 1, wherein the switching assembly comprises a first switching part having the first fitting part disposed therein and a second switching part having the second fitting part disposed therein which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second fitting part is released from the limitation of the limiting section of the second hinge part, and the first fitting part is limited by the engagement between the first limiting portion and the second limiting portion from the relative movement to the first hinge part.

3. The free embedded refrigerator according to claim 2, wherein the first hinge part and the first fitting part move relatively by a first shaft set and a first groove set which are fitted with each other, the first shaft set comprises the first shaft and a second shaft, the first groove set comprises the first groove fitted with the first shaft and a second groove fitted with the second shaft.

4. The free embedded refrigerator according to claim 2, wherein the first hinge part comprises the first shaft, the first fitting part comprises the first groove, the second fitting part comprises the third shaft and the fourth shaft, and the second hinge part comprises the third groove and the fourth groove.

5. The free embedded refrigerator according to claim 4, wherein the first switching part comprises the second limiting portion, the first groove comprises a first upper groove located at the first switching part and a first lower groove located at the second switching part, and the fourth groove comprises a fourth free section and the limiting section; when the door is opened from the closed state to the first opening angle, the first switching part and the second switching part are relatively stationary, a first free section is formed by overlapped parts of the first upper groove and the first lower groove, the first shaft stays in situ in the first free section, and the second limiting portion abuts against the first limiting portion, such that the switching assembly is limited by the engagement between the first limiting portion and the second limiting portion from the relative movement to the first hinge part; the fourth shaft is limited on the limiting section, such that the switching assembly limits the second hinge part; when the door is continuously opened from the first opening angle to the second opening angle, the first switching part and the second switching part move relatively, such that the fourth shaft is separated from the limiting section; when the door is continuously opened from the second opening angle to the maximum opening angle, the third shaft rotates in situ in the third groove, and the fourth shaft moves in the fourth free section around the third shaft.

6. The free embedded refrigerator according to claim 5, wherein the first switching part comprises a first stopper, the second switching part comprises a second stopper fitted with the first stopper, and when the door is closed from the second opening angle to the first opening angle, the second switching part limits movement of the first switching part by fitting the second stopper with the first stopper.

7. The free embedded refrigerator according to claim 4, wherein the cabinet comprises an accommodating chamber and an outer side surface adjacent to the hinge assembly and on an extension section of a rotation path of the door, the door comprises a front wall apart from the accommodating chamber and a side wall always clamped between the front wall and the accommodating chamber, and a side edge is provided between the front wall and the side wall; a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged, and when the door is continuously opened from the second opening angle to the maximum opening angle, the fourth pitch, the fifth pitch and the sixth pitch are all kept unchanged.

8. The free embedded refrigerator according to claim 7, wherein the first switching part comprises the third shaft, the second switching part has a through hole, the third shaft extends through the through hole to the third groove, the second switching part comprises the fourth shaft, and the fourth shaft extends to the fourth groove.

9. The free embedded refrigerator according to claim 4, wherein the cabinet comprises an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

10. The free embedded refrigerator according to claim 9, wherein the free embedded refrigerator further comprises an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

11. A free embedded refrigerator, comprising: a cabinet, a door for opening and closing the cabinet, and a hinge assembly for connecting the cabinet and the door, wherein the hinge assembly comprises a first hinge part fixed to the cabinet, a second hinge part fixed to the door and a switching assembly disposed between the first hinge part and the second hinged part, and engaged respectively with the first hinge part and the second hinge part; the first hinge part comprises a first limiting portion, the switching assembly comprises a second limiting portion, the first hinge part and the switching assembly move relatively by a first shaft and a first groove which are fitted with each other, and the first groove comprises a first free section; the second hinge part and the switching assembly move relatively by a second shaft set and a second groove set which are fitted with each other; the second shaft set comprises a third shaft and a fourth shaft, and the second groove set comprises a third free section, a fourth free section and a limiting section; when the door is in a closed state, the first shaft is located at the first free section, and the fourth shaft is located at the limiting section, such that the switching assembly limits the second hinge part; when the door is opened to a first opening angle from the closed state, the first shaft stays in situ in the first free section to drive the door to rotate in situ relative to the cabinet; when the door is continuously opened from the first opening angle to a second opening angle, the fourth shaft is separated from the limiting section, and the switching assembly is limited by engagement between the first limiting portion and the second limiting portion from relative movement to the first hinge part; when the door is continuously opened from the second opening angle to a maximum opening angle, the third shaft rotates in situ in the third free section, the fourth shaft moves in the fourth free section around the third shaft, and the door continuously rotates in situ relative to the cabinet;

wherein one of the first limiting portion and the second limiting portion is configured as a bump, the other is configured as a recess, the bump comprises a first limiting surface, and the recess comprises a second limiting surface; when the door is in the closed state, the first limiting surface is apart from the second limiting surface, and when the door is opened from the closed state to the first opening angle, the first limiting surface and the second limiting surface gradually approach until the first limiting surface abuts against the second limiting surface.

12. The free embedded refrigerator according to claim 11, wherein the first hinge part comprises the first shaft, the switching assembly comprises the first groove, the third shaft and the fourth shaft, and the second hinge part comprises a third groove with the third free section and a fourth groove with the fourth free section and the limiting section.

13. The free embedded refrigerator according to claim 12, wherein the switching assembly comprises a first switching part and a second switching part which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the fourth shaft is separated from the limiting section.

14. The free embedded refrigerator according to claim 13, wherein the first switching part comprises the second limiting portion, and the first groove comprises a first upper groove located at the first switching part and a first lower groove located at the second switching part; when the door is opened from the closed state to the first opening angle, a first free section is formed by overlapped parts of the first upper groove and the first lower groove, the first shaft stays in situ in the first free section, and the second limiting portion abuts against the first limiting portion, such that the switching assembly is limited by engagement between the first limiting portion and the second limiting portion from relative movement to the first hinge part; when the door is continuously opened from the first opening angle to the second opening angle, the first switching part moves relative to the second switching part, such that the fourth shaft is separated from the limiting section.

15. The free embedded refrigerator according to claim 11, wherein the door is provided with a first fitting portion, the cabinet is provided with a second fitting portion, the first fitting portion and the second fitting portion are engaged with each other when the door is in the closed state, and when the door is opened from the closed state to the first opening angle, the hinge assembly drives the door to rotate in situ relative to the cabinet, so as to drive the first fitting portion to be disengaged from the second fitting portion.

16. The free embedded refrigerator according to claim 15, wherein the cabinet comprises an accommodating chamber, the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the first door and the second door are in the closed state, the vertical beam extends to the second door; when the first door is opened from the closed state to the first opening angle, the first door rotates in situ relative to the cabinet, such that the vertical beam rotates towards a side close to the accommodating chamber, a first folding angle is formed between the first door and the vertical beam, and then, the vertical beam and the first door are kept relatively static.

17. The free embedded refrigerator according to claim 11, wherein the cabinet further comprises an accommodating chamber and a fixed beam dividing the accommodating chamber into a first compartment and a second compartment, and the door comprises a first door provided corresponding to the first compartment and a second door provided corresponding to the second compartment; when the first door and the second door are in the closed state, both the first door and the second door contact the fixed beam, and when the first door is opened from the closed state to the first opening angle, the hinge assembly drives the first door to rotate in situ relative to the cabinet, so as to drive the first door to be separated from the fixed beam.

* * * * *